United States Patent
Kompella et al.

(10) Patent No.: US 11,876,706 B2
(45) Date of Patent: *Jan. 16, 2024

(54) AVOIDING LOOPS BY PREVENTING FURTHER FAST REROUTE (FRR) AFTER AN EARLIER FRR

(71) Applicant: Juniper Networks, Inc., Sunnyvale, CA (US)

(72) Inventors: Kireeti Kompella, Los Altos, CA (US); Wen Lin, Andover, MA (US); Kevin Wang, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,335

(22) Filed: May 13, 2022

(65) Prior Publication Data

US 2022/0272034 A1   Aug. 25, 2022

Related U.S. Application Data

(63) Continuation of application No. 16/779,413, filed on Jan. 31, 2020, now Pat. No. 11,362,942.

(60) Provisional application No. 62/956,101, filed on Dec. 31, 2019.

(51) Int. Cl.
| | |
|---|---|
| *H04L 45/50* | (2022.01) |
| *H04L 12/46* | (2006.01) |
| *H04L 45/18* | (2022.01) |
| *H04L 45/00* | (2022.01) |
| *H04L 69/22* | (2022.01) |

(52) U.S. Cl.
CPC ........ *H04L 45/507* (2013.01); *H04L 12/4633* (2013.01); *H04L 45/18* (2013.01); *H04L 45/20* (2013.01); *H04L 45/22* (2013.01); *H04L 69/22* (2013.01)

(58) Field of Classification Search
CPC ..................................... H04L 45/507
See application file for complete search history.

(56) References Cited

U.S. PATENT DOCUMENTS

| | | | |
|---|---|---|---|
| 7,120,151 B1* | 10/2006 | Ginjpalli | H04L 45/28 |
| | | | 370/217 |
| 7,664,013 B2 | 2/2010 | Filsfils et al. | |
| 8,693,374 B1* | 4/2014 | Murphy | H04L 43/10 |
| | | | 370/255 |
| 11,362,942 B2* | 6/2022 | Kompella | H04L 45/20 |
| (Continued) | | | |

FOREIGN PATENT DOCUMENTS

CN   101120552 A   2/2008

OTHER PUBLICATIONS

Office Action to corresponding Chinese Patent Application No. 202010318733.5 dated Mar. 29, 2022, with partial translation.

(Continued)

*Primary Examiner* — Jason E Mattis

(74) *Attorney, Agent, or Firm* — John C. Pokotylo; Pokotylo Patent Services

(57) ABSTRACT

In some cases, once Fast Reroute (FRR) has taken place (e.g., for MPLS protection), a further FRR is undesirable, and even detrimental. A mechanism to prevent a further FRR, once such a further FRR is determined to be potentially harmful, is described.

20 Claims, 17 Drawing Sheets

(56) References Cited

U.S. PATENT DOCUMENTS

| | | | | |
|---|---|---|---|---|
| 2006/0164975 A1* | 7/2006 | Filsfils | .................... | H04L 45/50 |
| | | | | 370/225 |
| 2006/0221813 A1* | 10/2006 | Scudder | ................. | H04L 45/50 |
| | | | | 370/242 |
| 2013/0301403 A1* | 11/2013 | Esale | ...................... | H04L 45/50 |
| | | | | 370/221 |
| 2014/0280711 A1* | 9/2014 | Asati | .................... | H04L 45/484 |
| | | | | 709/217 |

OTHER PUBLICATIONS

Second Office Action to corresponding Chinese Patent Application No. 202010318733.5 dated Aug. 29, 2022, with partial translation.

\* cited by examiner

| NODE | ACTION | NEXT HOP | NEW PACKET | COMMENT |
|---|---|---|---|---|
| N1 | PUSH L1 | N2 | [L1] PKT | INGRESS |
| N2 | SWAP L1 -> L2 | N3 | [L2] PKT | READY FOR PROTECTION |
| N3 | SWAP L2 -> L3 | N4 | [L3] PKT | |
| N4 | POP L3 | - | PKT | EGRESS UHP |

FORWARDING TABLE FROM N1 TO N4 (NORMAL)

| NODE | ACTION | NEXT HOP | NEW PACKET | COMMENT |
|---|---|---|---|---|
| N2 | PUSH L4 | N6 | [L4] PKT | INGRESS |
| N6 | SWAP L4 -> L5 | N7 | [L5] PKT | READY FOR PROTECTION |
| N7 | POP L5 | N3 | PKT | EGRESS PHP |

*BYPASS FORWARDING TABLE FOR PROTECTING LINK N2-N3*

| NODE | ACTION | NEXT HOP | NEW PACKET | COMMENT |
|------|--------|----------|------------|---------|
| N6 | PUSH L11 | N2 | [L11] PKT | INGRESS |
| N2 | SWAP L11 -> L12 | N3 | [L12] PKT | |
| N3 | POP L12 | N7 | PKT | EGRESS PHP |

*BYPASS FORWARDING TABLE FOR PROTECTING LINK N6-N7*

| NODE | ACTION | NEXT HOP | NEW PACKET | COMMENT |
|---|---|---|---|---|
| N1 | PUSH L1 | N2 | [L1] PKT | INGRESS |
| N2 | SWAP L1* -> L2 | N3 | [L2] PKT | PROTECTION ENABLED |
| N3 | SWAP L2* -> L3 | N4 | [L3] PKT | |
| N4 | POP L3 | - | PKT | EGRESS UHP |

*FORWARDING TABLE*

| NODE | ACTION | NEXT HOP | NEW PACKET | COMMENT |
|---|---|---|---|---|
| N2 | PUSH L4 | N6 | [L4] PKT | INGRESS |
| N6 | SWAP L4 -> L5 | N7 | [L5] PKT | SEE N6-N7 BACKUP |
| N7 | POP L5 | N3 | PKT | EGRESS PHP |

*BYPASS FORWARDING TABLE FOR PROTECTING LINK N2-N3*

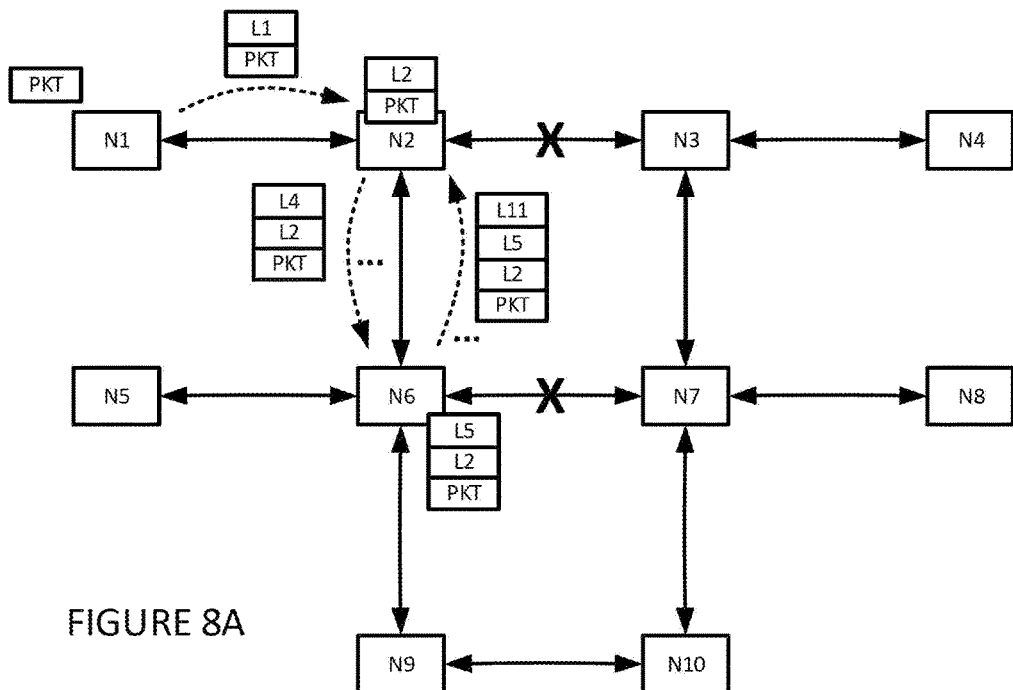

FIGURE 8A

| NODE | ACTION | NEXT HOP | NEW PACKET | COMMENT |
|---|---|---|---|---|
| N1 | PUSH L1 | N2 | [L1] PKT | INGRESS |
| N2 | SWAP L1 -> L2 | N3 | [L2] PKT | PROTECTION ENABLED |
| N3 | SWAP L2 -> L3 | N4 | [L3] PKT | |
| N4 | POP L3 | - | PKT | EGRESS UHP |

FIGURE 8B     *FORWARDING TABLE*

| NODE | ACTION | NEXT HOP | NEW PACKET | COMMENT |
|---|---|---|---|---|
| N2 | PUSH L4 | N6 | [L4] PKT | INGRESS |
| N6 | SWAP L4 -> L5 | N7 | [L5] PKT | PROTECTION ENABLED |
| N7 | POP L5 | N3 | PKT | EGRESS PHP |

FIGURE 8C     *BYPASS FORWARDING TABLE FOR PROTECTING LINK N2-N3*

| NODE | ACTION | NEXT HOP | NEW PACKET | COMMENT |
|---|---|---|---|---|
| N6 | PUSH L11 | N2 | [L11] PKT | INGRESS |
| N2 | SWAP L11 -> L12 | N3 | [L12] PKT | |
| N3 | POP L12 | N7 | PKT | EGRESS PHP |

FIGURE 8D     *BYPASS FORWARDING TABLE FOR PROTECTING LINK N6-N7*

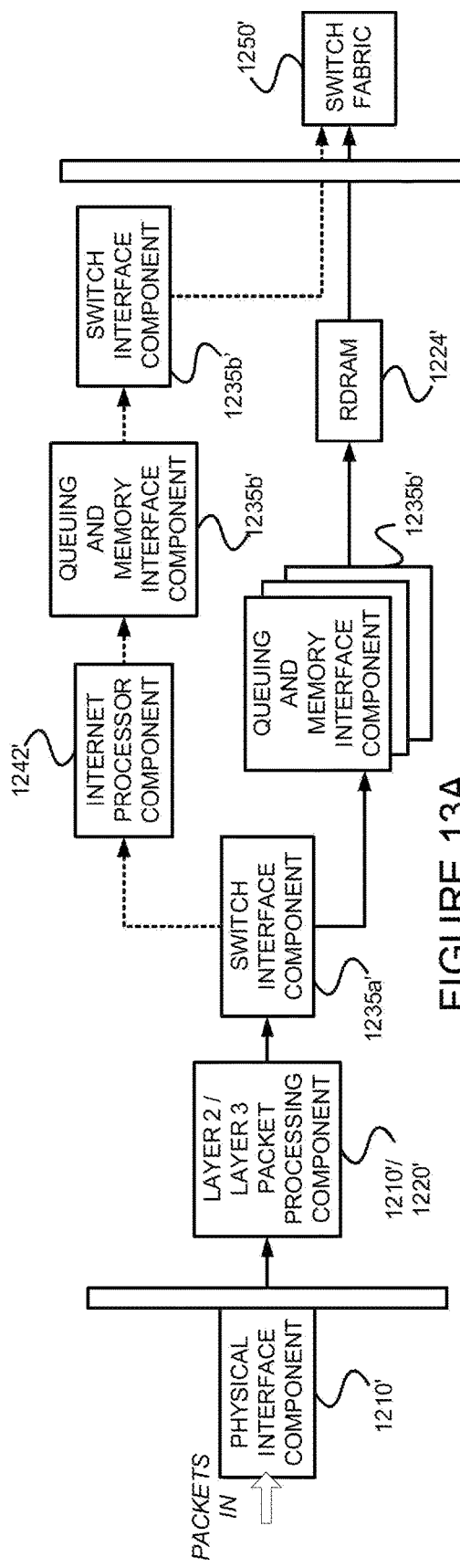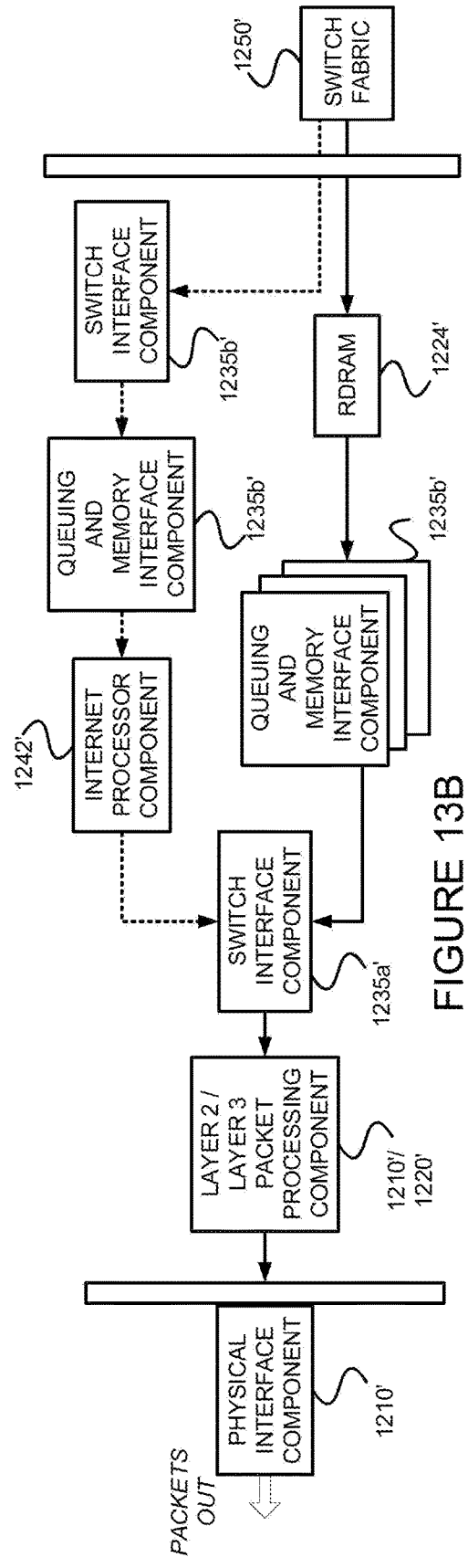
FIGURE 13A
FIGURE 13B

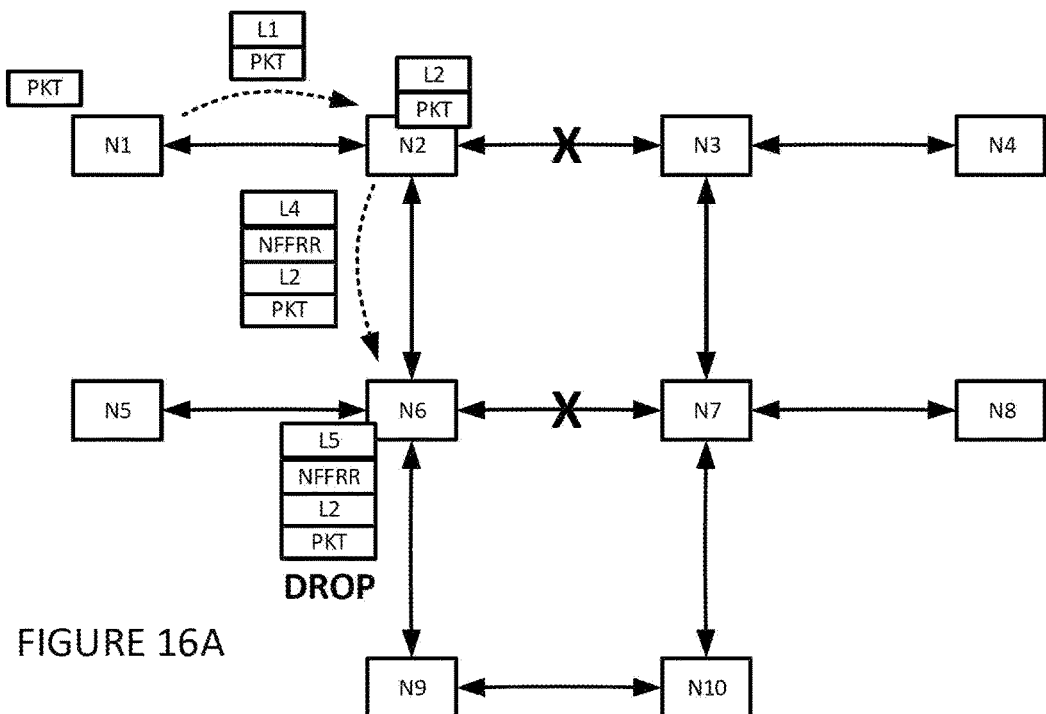

FIGURE 16A

| NODE | ACTION | NEXT HOP | NEW PACKET | COMMENT |
|---|---|---|---|---|
| N1 | PUSH L1 | N2 | [L1] PKT | INGRESS |
| N2 | SWAP L1 -> L2 | N3 | [L2] PKT | PROTECTION ENABLED |
| N3 | SWAP L2 -> L3 | N4 | [L3] PKT | |
| N4 | POP L3 | - | PKT | EGRESS UHP |

FIGURE 16B        *FORWARDING TABLE*

| NODE | ACTION | NEXT HOP | NEW PACKET | COMMENT |
|---|---|---|---|---|
| N2 | PUSH L4, PUSH NFFRR | N6 | [L4] PKT | INGRESS |
| N6 | SWAP L4 -> L5 | N7 | [L5] PKT | ALREADY PROTECTED |
| N7 | POP L5 (POP NFFRR) | N3 | PKT | EGRESS PHP |

FIGURE 16C    *BYPASS FORWARDING TABLE FOR PROTECTING LINK N2-N3*

| NODE | ACTION | NEXT HOP | NEW PACKET | COMMENT |
|---|---|---|---|---|
| N6 | PUSH L11, PUSH NFFRR | N2 | [L11] PKT | INGRESS |
| N2 | SWAP L11 -> L12 | N3 | [L12] PKT | |
| N3 | POP L12 (POP NFFRR) | N7 | PKT | EGRESS PHP |

FIGURE 16D    *BYPASS FORWARDING TABLE FOR PROTECTING LINK N6-N7*

| NODE | ACTION | NEXT HOP | NEW PACKET | COMMENT |
|---|---|---|---|---|
| N1 | PUSH L1 | N2 | [L1] PKT | INGRESS |
| N2 | SWAP L1* -> L2 | N3 | [L2] PKT | PROTECTION ENABLED |
| N3 | SWAP L2* -> L3 | N4 | [L3] PKT | |
| N4 | POP L3 | - | PKT | EGRESS UHP |

*FORWARDING TABLE*

| NODE | ACTION | NEXT HOP | NEW PACKET | COMMENT |
|---|---|---|---|---|
| N2 | PUSH L4, PUSH NFFRR | N6 | [L4] PKT | INGRESS |
| N6 | SWAP L4 -> L5 | N7 | [L5] PKT | READY FOR PROTECTION |
| N7 | POP L5, POP NFFRR | N3 | PKT | EGRESS PHP |

*BYPASS FORWARDING TABLE FOR PROTECTING LINK N2-N3*

AVOIDING LOOPS BY PREVENTING FURTHER FAST REROUTE (FRR) AFTER AN EARLIER FRR

§ 0. RELATED APPLICATION(S)

The present application is a continuation of pending U.S. patent application Ser. No. 16/779,413 (referred to as "the '413 application" and incorporated herein by reference), filed on Jan. 31, 2020, titled "AVOIDING LOOPS BY PREVENTING FURTHER FAST REROUTE (FRR) AFTER AN EARLIER FRR," and listing Kireeti Kompella, Wen Lin and Kevin F. Wang as the inventors, the '413 application claiming benefit to the filing date of U.S. Provisional Application No. 62/956,101 (referred to as "the '101 provisional" and incorporated herein by reference), titled "AVOIDING LOOPS BY PREVENTING FURTHER FAST REROUTE (FRR) AFTER AN EARLIER FRR," filed on Dec. 31, 2019 and listing Kireeti Kompella, Wen Lin and Kevin F. Wang and as the inventors. The scope of the invention is not limited to any requirements of the specific embodiments in the '101 provisional.

§ 1. BACKGROUND OF THE INVENTION

§ 1.1 Field of the Invention

The present description concerns communications networks. More specifically, the present description concerns communications networks that employ fast reroute (FRR) and its potential to cause the problem of looping.

§ 1.2. Background Information

§ 1.2.1 Multiprotocol Label Switching (MPLS)

Multiprotocol Label Switching (MPLS) is a method for engineering traffic patterns by assigning short labels to network packets that describe how to forward them through the network. MPLS is independent of routing tables or any routing protocol and can be used for unicast and/or multicast packets. More specifically, in a traditional Internet protocol (IP) network, packets are transmitted with an IP header that includes a source and destination address. When a router receives such a packet, it examines its forwarding tables for the next-hop address associated with the packet's destination address and forwards the packet to the next-hop location. On the other hand, in an MPLS network, each packet is encapsulated with an MPLS header. When a router receives the packet, it copies the header as an index into a separate MPLS forwarding table. Each entry in the MPLS forwarding table includes forwarding information that the router uses to forward the traffic and modify, when necessary, the MPLS header. Since the MPLS forwarding table has far fewer entries than the more general forwarding table, the lookup consumes less processing time and processing power. The resultant savings in time and processing are a significant benefit for traffic that uses the network to transit between outside destinations only.

Label-switched paths (LSPs) are unidirectional routes through a network or autonomous system (AS). In normal IP routing, the packet has no predetermined path. Instead, each router forwards a packet to the next-hop address stored in its forwarding table, based only on the packet's destination address. Each subsequent router then forwards the packet using its own forwarding table. In contrast, MPLS routers (within an AS) determine paths through a network through the exchange of MPLS traffic engineering information. Using these paths, the routers direct traffic through the network along an established route. Rather than selecting the next hop along the path as in IP routing, each router is responsible for forwarding the packet to a predetermined next-hop address.

Routers that are part of the LSP are referred to label-switching routers (LSRs). Each LSR must be configured with MPLS so that it can interpret MPLS headers and perform the MPLS operations required to pass traffic through the network. An LSP can include four types of LSRs. First, an ingress or inbound LSR provides the entry point for traffic into MPLS. Native IPv4 packets (or Ethernet packets) are encapsulated using an MPLS label by the ingress router. Each LSP can have only one ingress router. Second, a transit LSR is any router in the middle of an LSP. Transit LSRs forward MPLS traffic along the LSP, using only the MPLS header to determine how the packet is routed. Third, the penultimate LSR is the second-to-last router in the LSP. If penultimate hop popping (PHP) is employed, the penultimate LSR is responsible for stripping the MPLS header from the packet before forwarding it to the outbound router. Fourth, the egress or outbound LSR is the endpoint for the LSP. The egress router receives MPLS packets from the penultimate LSR and performs an IP route lookup. (Note that in some topologies or with some services, an additional label (called a "service label") is provided, and the egress router forwards the traffic using the service label. Thus, if the payload is an IP packet, the egress router may forward the IP packet based on either of the following: (A) IP route lookup if egress router uses label per VRF scheme, the label recognize the VRF table to which that the IP route lookup will take place; or (B) based on MPLS (service) label if the egress router uses label per interface scheme for forwarding. In this case, there is no IP route lookup.) The egress router then forwards the packet to the next hop of the route. Each LSP can have only one outbound router.

To forward traffic through an MPLS network, MPLS routers encapsulate packets and assign and manage headers known as labels. A label is a 20-bit unsigned integer in the range 0 through 1,048,575. The routers use the labels to index the MPLS forwarding tables that determine how packets are routed through the network. When a network's inbound router receives traffic, it inserts an MPLS label between the IP packet and the appropriate Layer 2 header for the physical link. The label contains an index value that identifies a next-hop address for the particular LSP. When the next-hop transit router receives the packet, it uses the index in the MPLS label to determine the next-hop address for the packet and forwards the packet to the next router in the LSP. As each packet travels through the transit network, every router along the way performs a lookup on the MPLS label and forwards the packet accordingly. When the egress router receives a packet, it examines the header to determine that it is the final router in the LSP. The egress router then removes the MPLS header, performs a regular IP route lookup (or forwarding based on a service label), and forwards the packet with its IP header to the next-hop address.

LSRs can perform five label operations, First, a "push" operation adds a new label to the top of the packet. For IPv4 packets arriving at the inbound router, the new label is the first label in the label stack. For MPLS packets with an existing label, this operation adds a label to the stack and sets the stacking bit to 0, indicating that more MPLS labels follow the first. When the ingress router receives the packet, it performs an IP route lookup on the packet. Because the route lookup yields an LSP next hop, the ingress router performs a label push on the packet, and then forwards the packet to the LSP next hop. Second, a "swap" (or switch) operation replaces the label at the top of the label stack with a new label. When a transit router receives the packet, it performs an MPLS forwarding table lookup. The lookup yields the LSP next hop and the path index of the link between the transit router and the next router in the LSP. Third, a "pop" operation removes the label from the top of the label stack. For IPv4 packets arriving at the penultimate router, the entire MPLS label is removed from the label stack. For MPLS packets with an existing label, this operation removes the top label from the label stack and modifies the stacking bit as necessary (e.g., sets it to 1 if only a single label remains in the stack). If multiple LSPs terminate at the same outbound router, the router performs MPLS label operations for all outbound traffic on the LSPs. To share the operations among multiple routers, most LSPs use penultimate hop popping (PHP). Fourth, a "multiple push" operation adds multiple labels to the top of the label stack. This action is equivalent to performing multiple push operations. Finally, a "swap and push" operation replaces the top label with a new label and then pushes a new label to the top of the stack.

An MPLS LSP may be established either (A) statically (e.g., via manual configuration), or (B) dynamically (e.g., using a protocol such as the label distribution protocol (LDP) or the resource reservation protocol (RSVP)). Like a static route, a static LSP requires each router along the path to be configured explicitly. A network administrator must manually configure the path and its associated label values. Static LSPs require less processing by the LSRs because no signaling protocol is used. However, because paths are statically configured, they cannot adapt to network conditions. Dynamic LSPs use signaling protocols to establish themselves and propagate LSP information to other LSRs in the network. A network administrator configures the inbound router with LSP information that is transmitted throughout the network when they enable the signaling protocols across the LSRs. Because the LSRs must exchange and process signaling packets and instructions, dynamic LSPs consume more resources than static LSPs. However, dynamic LSPs can avoid the network problems by detecting topology changes and outages and propagating them throughout the network.

FIG. 1 illustrates an example of an LSP between ingress router R1 (PE1) and egress router R5 (PE2). Typically, when MPLS is deployed, penultimate hop popping ("PHP") is used instead of ultimate hop popping ("UHP"). Router CE1 forwards an Internet Protocol (IP) packet to its next hop (R1), which is also the LSP ingress (or headend). R1 finds that to forward the traffic to the destination IP address of the IP packet, it needs to send the IP packet to 5.5.5.5. R1 checks prefix 5.5.5.5 (destination loopback) against the following information stored in its forwarding table:

```
enugadi@Enugadi# run show route 5.5.5.5
inet.0: 16 destinations, 17 routes (15 active, 0 holddown, 1 hidden)
+ = Active Route, - = Last Active, * = Both
5.5.5.5/32          *[Static/5] 01:33:28
                    > to 10.0.0.2 via ge-0/0/0.10, Push 1000002
                    [OSPF/10] 01:01:42, metric 5
                    > to 10.0.0.2 via ge-0/0/0.10
```

R1 pushes label L1 (L1-1000002) on the packet and forwards the labeled packet (L1+IP) to router R2. R2 checks input label 1000002 against the following information stored in its MPLS forwarding table:

```
enugadi@Enugadi# run show route table mpls.0 label 1000002 logical-router r2
mpls.0: 6 destinations, 6 routes (6 active, 0 holddown, 0 hidden)
+ = Active Route, - = Last Active, * = Both
1000002             *[Static/5] 00:45:22
                    > to 10.0.0.6 via ge-0/1/0.10, Swap 1000003
```

As a result, R2 completes the standard MPLS label swapping operation, swapping label L1 for label L2 (L2-10000003), and forwards the labeled packet (L2+IP) to router R3. R3 checks the input label 10000003 against the following information stored in its MPLS forwarding table:

```
enugadi@Enugadi# run show route table mpls.0 label 1000003 logical-router r3
mpls.0: 5 destinations, 5 routes (5 active, 0 holddown, 0 hidden)
+ = Active Route, - = Last Active, * = Both
1000003             *[Static/5] 00:50:03
                    > to 10.0.0.10 via ge-0/0/0.11, Swap 1000004
```

As a result, R3 completes the standard MPLS label swapping operation, swapping label L2 for label L3 (L3-10000004), and forwards the labeled packet (L3+IP) to router R4. R4 checks the input label 10000004 against the following information stored in its MPLS forwarding table:

```
enugadi@Enugadi# run show route table mpls.0 label 1000004 logical-router r4
mpls.0: 6 destinations, 6 routes (6 active, 0 holddown, 0 hidden)
+ = Active Route, - = Last Active, * = Both
1000004             *[Static/5] 01:24:54
                    > to 10.0.0.14 via ge-0/0/0.11, Swap 0
1000004(S=0)        *[Static/5] 01:24:54
                    > to 10.0.0.14 via ge-0/0/0.11, Pop
```

Since R4 is the penultimate-hop router for the LSP to router R5 (PE2), it first pops the label L3 and then forwards the packet to router R5. When R5 receives the packet, it can have a service label, an explicit-null label, or just be a plain IP or layer 2 Ethernet packet. R5 then forwards the unlabeled packet to router CE2.

In summary, with the static LSP, R1 reaches R5 through MPLS labeling which is indicated by traceroute result below:

```
enugadi@Enugadi# run traceroute 5.5.5.5
traceroute to 5.5.5.5 (5.5.5.5), 30 hops max, 40 byte packets
  1    10.0.0.2 (10.0.0.2) 0.172 ms 0.118 ms 0.109 ms
       MPLS Label=1000002 CoS=0 TTL=1 S=1
  2    10.0.0.6 (10.0.0.6) 0.204 ms 0.194 ms 0.192 ms
       MPLS Label=1000003 CoS=0 TTL=1 S=1
  3    10.0.0.10 (10.0.0.10) 0.288 ms 0.283 ms 0.280 ms
       MPLS Label=1000004 CoS=0 TTL=1 S=1
  4    5.5.5.5 (5.5.5.5) 0.336 ms 0.332 ms 0.336 ms
```

§ 1.2.2 The Use of MPLS and FRR in Various Networks

As will be discussed in more details below, MPLS can be used to provide end-to-end transport in a provider network, such as an Ethernet Virtual Private Network (EVPN) (See, e.g., FIG. 2.), transport in a ring used for traffic protection (See, e.g., FIG. 3.), and in other network topologies (See, e.g., FIG. 4.). Such topologies may employ FRR in the event of a link or node failure (e.g., when a next hop address or next hop interface, referred to generally as a "next hop") to redirect traffic around the failure. That is, MPLS Fast Reroute (FRR) is a useful and widely deployed tool for minimizing packet loss in the case of a link, and/or node failure. Not only has FRR proven to be very effective, it is often the reason for using MPLS as a data plane. FRR works for a variety of control plane protocols, including the label distribution protocol (LDP), the ReSource Reservation Protocol-Traffic Engineering (RSVP-TE), and segment routing (SR, also referred to as Source Packet Routing in NetworkinG (SPRING)). Furthermore, FRR is often used to protect MPLS services such as IP VPN and EVPN.

§ 1.2.3 Potential Problem of Looping Caused by FRR

Unfortunately, there are cases in which, once FRR has occurred, if the packet encounters a second failure, a second FRR is not helpful, and indeed may even be disruptive. For example, a second FRR may unintentionally cause the packet to loop until its time to live (TTL) counter expires. This looping can lead to link congestion and further packet loss. Examples of this problem are described in §§ 1.2.3.1-1.2.3.3 below, with reference to EVPN networks, ring protection networks, and "plain" MPLS forwarding.

§ 1.2.3.1 Potential Problem of Looping Caused by FRR in EVPN Networks Employing Active-Active Multihoming Referring to FIG. 2, consider the following topology for multihoming a customer edge device (CE2) for protection against the failure of a provider edge device (PE2 or PE3) or a PE-CE link. To do so, a backup MPLS path is provisioned between PE2 and PE3 (denoted by the dotted line).

Suppose (known unicast) traffic goes from CE1 to CE2. With active-active multihoming, this traffic will be load-balanced between PE2 (to CE2 via link 1a) and PE3 (to CE2 via link 1b). For example, if link 1a were to fail, PE2 could still advance traffic destined for CE2 by sending it over the backup path to PE3, which would then forward it to CE2 via link 1b. Similarly, if link 1b were to fail, PE3 could still advance traffic destined for CE2 by sending it over the backup path to PE2, which would then forward it to CE2 via link 1a.

Suppose, however, that CE2 is down. This can lead to traffic "looping" between PE2 and PE3. More specifically, if PE2 receives traffic destined for CE2, PE2 will assume link 1a is down and consequently, it will send traffic for CE2 to PE3 over the backup path. However, PE3 will assume that link 1b is down and will therefore protect against this "second" (Note that the single node failure of CE2 is manifested as separate failures to PE2 and PE3.) failure by sending traffic for CE2 over the backup path to PE2. This traffic will loop ("ping-pong") between PE2 and PE3 until its TTL expires.

As can be appreciated from the foregoing example, the attempt to protect traffic to CE2 may end up doing more harm than good, because in the event of a failure of node CE2 (or in the event of a double link failure of 1a and 1b), the backup path between PE2 and PE3 becomes congested. Further, PE2 and PE3 are performing useless work.

A similar topology can be used in EVPN-Etree (See, e.g., the document, A. Sajassi, Ed., "Ethernet-Tree (E-Tree) Support in Ethernet VPN (EVPN) and Provider Backbone Bridging EVPN (PBB-EVPN)," Request for Comments 8317 (Internet Engineering Task Force, January 2018)(referred to as "RFC 8317" and incorporated herein by reference).), EVPN-VPWS (See, e.g., the document, S. Boutros, et al., "Virtual Private Wire Service Support in Ethernet VPN,"

Request for Comments 8214 (Internet Engineering Task Force, August 2017)(referred to as "RFC 8214" and incorporated herein by reference).), IP VPN (See, e.g., the document, E. Rosen, et al., "BGP/MPLS IP Virtual Private Networks (VPNs)," Request for Comments 4364 (Internet Engineering Task Force, February 2006)(referred to as "RFC 4364" and incorporated herein by reference).), or VPLS (See, e.g., the documents, K. Kompella, Ed., "Virtual Private LAN Service (VPLS) Using BGP for Auto-Discovery and Signaling," Request for Comments 4761 (Internet Engineering Task Force, January 2007)(referred to as "RFC 4761" and incorporated herein by reference) and M. Lasserre, Ed., "Virtual Private LAN Service (VPLS) Using Label Distribution Protocol (LDP) Signaling," Request for Comments 4762 (Internet Engineering Task Force, January 2007)(referring to as "RFC 4762" and incorporated herein by reference).). If so, the same looping behavior would occur for unicast traffic if CE2 is down.

§ 1.2.3.2 Potential Problem of Looping Caused by FRR in Ring Protection Networks FIG. 3 illustrates an example Resilient MPLS Ring (RMR) (See, e.g., the document, K. Kompella, et al., "Resilient MPLS Rings," draft-ietf-mpls-rmr-12 (Internet Engineering Task Force, Oct. 23, 2019)(referred to as "the RMR draft" and incorporated herein by reference), and see also, U.S. patent application Ser. No. 16/588,434, titled "RESILIENT MULTIPROTOCOL LABEL SWITCHING (MPLS) RINGS USING SEGMENT ROUTING," filed on Sep. 30, 2019 and listing Raveendra Torvi, Abhishek Deshmukh, Kireeti Kompella, Tarek Saad, Vishnu Pavan Beeram and Ronald Bonica as inventors) having nodes R0-R7 linked to form a ring. Traffic can progress along the ring in a clockwise direction, as indicated by the dotted arc, or in a anti-clockwise direction, as indicated by the dot-dash arc. Suppose, for example, that data traffic goes from R0 to R4 over a clockwise path; R0→R1→R2→R3→R4. If any of the links or nodes (other than R0 and R4) in this clockwise path fail, the data traffic can be protected by switching this data traffic onto an anti-clockwise path from R0 to R4; namely R0→R7→R6→R5→R4. This protection works well if a node or link between R0 or R4 is down. If, however, node R4 itself is down, its adjacent neighbor R3 will send the data traffic anti-clockwise to R4 (via R2, R1, R0, R7, R6 and R5). When this redirected data traffic reaches R4's other adjacent neighbor, R5, since R4 is down, R5 will send the data traffic clockwise to R4 (via R6, R7, R0, R1, R2 and R3). The data traffic will continue to loop (alternate between clockwise and anti-clockwise paths) until the TTL expires. (A similar looping problem can occur in the event of a double link failure; one link on the clockwise path and the other link on the anticlockwise path.) The RMR draft provides more details, and offers some means of mitigation, though it would be useful to improve upon the techniques described in the RMR draft.

§ 1.2.3.3 Potential Problem of Looping Caused by FRR in MPLS Networks

Next, consider general MPLS forwarding in the example topology of FIG. 4A. FIG. 4B illustrates forwarding table entries to advance data traffic from N1 to N4. Referring to FIGS. 4A and 4B, assume that there is an LSP from N1 to N4, configured as path N1-N2-N3-N4. Under normal operation, when a packet (PKT) arrives at N1, N1 pushes label L1 onto the packet and sends the resulting labeled packet (L1-PKT) to next hop N2. N2 then swaps label L1 for label L2 and forwards the resulting labeled packet (L2-PKT) to next hop N3. N3 then swaps label L2 for label L3 and forwards the resulting labeled packet (L3-PKT) to next hop N4. N4 then pops the label L3 and forwards the resulting packet (PKT) towards its destination based on further information (not shown) in its forwarding table.

FIGS. 5A and 5B are used to illustrate bypass forwarding in the event of a failure of link N2-N3. FIG. 5B includes bypass forwarding table entries to provide link protection for link N2-N3. More specifically, referring to FIGS. 5A and 5B, link N2-N3 is protected by a bypass tunnel N2-N6-N7-N3. (This bypass tunnel may be, for example, manually configured, set up using RSVP-TE (See, e.g., the document, D. Awduche, et al., "RSVP-TE: Extensions to RSVP for LSP Tunnels," Request for Comments 3209 (Internet Engineering Task Force, December 2001)(referred to as "RFC 3209" and incorporated herein by reference).), or set up using SPRING stacks (See, e.g., the document, A. Bashandy, Ed., "Segment Routing with MPLS data plane," draft-ietf-spring-segment-routing-mpls-22 (Internet Engineering Task Force, May 1, 2019)(referred to as the "SR MPLS draft" and incorporated herein by reference).) As shown, when data traffic (PKT) is received by N2, since the link N2-N3 is unavailable, N2 pushes on label L4 and sends the resulting data (L4-PKT) to next hop N6. N6 swaps the label L4 for L5 and sends the resulting data (L5-PKT) to next hop N7. N7 then pops the label L5 and sends the resulting data (PKT) to next node N3. That is, for an LSP N1-N2-N3-N4, the link N2-N3 may be protected by the bypass N2-N6-N7-N3.

FIGS. 6A and 6B illustrate bypassing failed link N6-N7. FIG. 6B includes bypass forwarding table entries to provide link protection for link N6-N7. As shown, when data traffic { . . . } is received by N6, N6 pushes on label L11 and sends the resulting data (L11-{ . . . }) to next hop N2. N2 swaps the label L11 for L12 and sends the resulting data (L12-{ . . . }) to next hop N3. N3 then pops the label L12 and sends the resulting data ({ . . . }) to next node N7. That is, for an LSP N5-N6-N7-N8, the link N6-N7 may be protected by the bypass N6-N2-N3-N7 (or by N6-N9-N10-N7 (not shown), or by load-balancing between these two bypass paths).

Referring to FIGS. 7A-7C, the foregoing path from N1 to N4 is provided with the following link protection. If link N2-N3 fails, traffic will take the path N1-N2-N6-N7-N3-N4. More specifically, when a packet (PKT) arrives at N1, N1 pushes label L1 onto the packet and sends the resulting labeled packet (L1-PKT) to next hop N2. Since the N2-N3 link has failed, after swapping label L1 for label L2, N2 uses the bypass forwarding table of FIG. 7C to push label L4 onto the stack and sends the resulting data (L4-L2-PKT) to next hop N6. N6 then swaps label L4 for label L5 and sends the resulting data (L5-L2-PKT) to next hop N7. N7 then pops label L5 and sends the resulting labeled packet (L2-PKT) to next hop N3. N3 then swaps label L2 for label L3 and forwards the resulting labeled packet (L3-PKT) to next hop N4. N4 then pops the label L3 and forwards the resulting packet (PKT) towards its destination based on further information (not shown) in its forwarding table.

FIGS. 8A-8D illustrate a problem that occurs if both links N2-N3 and N6-N7 fail simultaneously. Referring to FIGS. 8B and 8C, the bypass LSP protecting link N2-N3 is invoked, and traffic is to be sent to N3 via N6 and N7. More specifically, when a packet (PKT) arrives at N1, N1 pushes label L1 onto the packet and sends the resulting labeled packet (L1-PKT) to next hop N2. Since the N2-N3 link has failed, instead of simply swapping label L1 for label L2, N2 uses the bypass forwarding table of FIG. 8C to also push label L4 onto the stack and sends the resulting data (L4-L2-PKT) to next hop N6. Since the N6-N7 has failed, instead of simply swapping label L4 for label L5, and sending the result to next hop N7, N6 instead swaps the labels, pushes label L11 onto the stack, and sends the resulting data traffic (L11-L5-L2-PKT) to next hop N2. (See FIGS. 8C and 8D.) Since link N2-N3 has failed, N2 will push label L4 onto the stack, and send the resulting data traffic (L4-L11-L5-L2-PKT) to next hop N6. As can be appreciated, the data traffic will loop (or "ping-pong") between N2 and N6 until the TTL expires (or until the stack depth becomes too long).). (Note that if traffic is protected via a bypass N6-N9-N10-N7 in the event of link N6-N7 failure, such traffic will successfully make it to N4. If link N6-N7 is protected by load-balancing across the two bypass paths (namely N6-N2-N3-N7 and N6-N9-N10-N7), then about half the traffic will loop between N6 and N2, and the rest will make it to N4.

§ 2. SUMMARY OF THE INVENTION

The present description describes a mechanism for preventing further FRR in instances in which such further protection may be harmful. (Recall, e.g., § 1.2.3 above.) That is, in some cases, once Fast Reroute (FRR) has occurred (e.g., for MPLS protection), a further FRR is undesirable, and even detrimental. A mechanism to prevent a further FRR, once such a further FRR is determined to be potentially harmful, is described. Such a mechanism may use, for example, a special-purpose label (SPL), or an extended special-purpose label (ESPL), or an allocated label.

More specifically, the potential problem of loops in a communications network once a FRR has occurred may be solved by providing an example computer-implemented method comprising: (a) receiving, by a first data forwarding device, a data packet to be forwarded over a label-switched path (LSP); (b) determining a next hop of the data packet received; (c) determining whether or not the next hop is reachable; and (d) responsive to determining that the next hop is not reachable, (1) determining (i) a backup next hop and (ii) a forwarding label associated with the backup next hop, (2) adding to the data packet, the forwarding label and information indicating that a backup detour is being made, to generate an updated data packet, and (3) forwarding, by the data forwarding device, the updated data packet to the backup next hop, and otherwise, responsive to determining that the next hop is reachable, forwarding the data packet using a forwarding label associated with the next hop.

The example method may further include: (e) receiving, by a second data forwarding device on the LSP, an instance of the data packet; (f) determining a further next hop of the instance of the data packet received; (g) determining whether or not the further next hop is reachable; (h) responsive to determining that the further next hop is not reachable, (1) determining whether or not the instance of the data packet received includes the information indicating that a backup detour was made, and (2) responsive to the determination that the instance of the data packet received includes the information indicating that a backup detour was made, dropping the instance of the data packet, and otherwise, responsive to determining that the further next hop is available, forwarding the instance of the data packet using a forwarding label associated with the further next hop.

In some example embodiments, the information indicating that a backup detour is being made is a special purpose label, or an allocated label.

In some example embodiments, the act of adding to the data packet, the forwarding label and information indicating that a backup detour is being made, to generate an updated data packet, includes (1) replacing a forwarding label on the data packet received with the forwarding label associated with the backup next hop, and (2) pushing a label used to indicate that a backup detour is being made.

In some example embodiments, the act of adding to the data packet, the forwarding label and information indicating that a backup detour is being made, to generate an updated data packet, includes (1) stacking the forwarding label associated with the backup next hop over a forwarding label on the data packet received, and (2) pushing a label used to indicate that a backup detour is being made.

In some example embodiments, the backup next hop points to a backup LSP, wherein the backup LSP includes a plurality of data forwarding devices, and wherein each of the data forwarding devices included in the backup LSP have used control signaling to indicate that they are capable of processing the information indicating that a backup detour is being made.

In some example embodiments, the backup next hop is part of one of (A) a detour LSP, (B) a backup tunnel, (C) a bypass tunnel, (D) an NHOP bypass tunnel, (E) an NNHOP bypass tunnel, and (F) a backup LSP.

§ 3. BRIEF DESCRIPTION OF THE DRAWINGS

FIGS. 8A-8D illustrate the potential problem of looping in the example network of FIG. 4A in the event of a double link failure and more than one FRR.

FIGS. 13A and 13B is an example of operations of the example architecture of FIG. 12.

FIGS. 16A-16D illustrate operations of the example method of FIG. 9 in the example network of FIG. 4A.

§ 4. DETAILED DESCRIPTION

The present disclosure may involve novel methods, apparatus, message formats, and/or data structures for avoiding loops in communications networks, such as communications networks that employ FRR. The following description is presented to enable one skilled in the art to make and use the described embodiments, and is provided in the context of particular applications and their requirements. Thus, the following description of example embodiments provides illustration and description, but is not intended to be exhaustive or to limit the present disclosure to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present description unless explicitly described as such. Also, as used herein, the article "a" is intended to include one or more items. Where only one item is intended, the term "one" or similar language is used. Thus, the present disclosure is not intended to be limited to the embodiments shown and the inventors regard their invention as any patentable subject matter described.

§ 4.1 Example Method(s)

Figure 9:
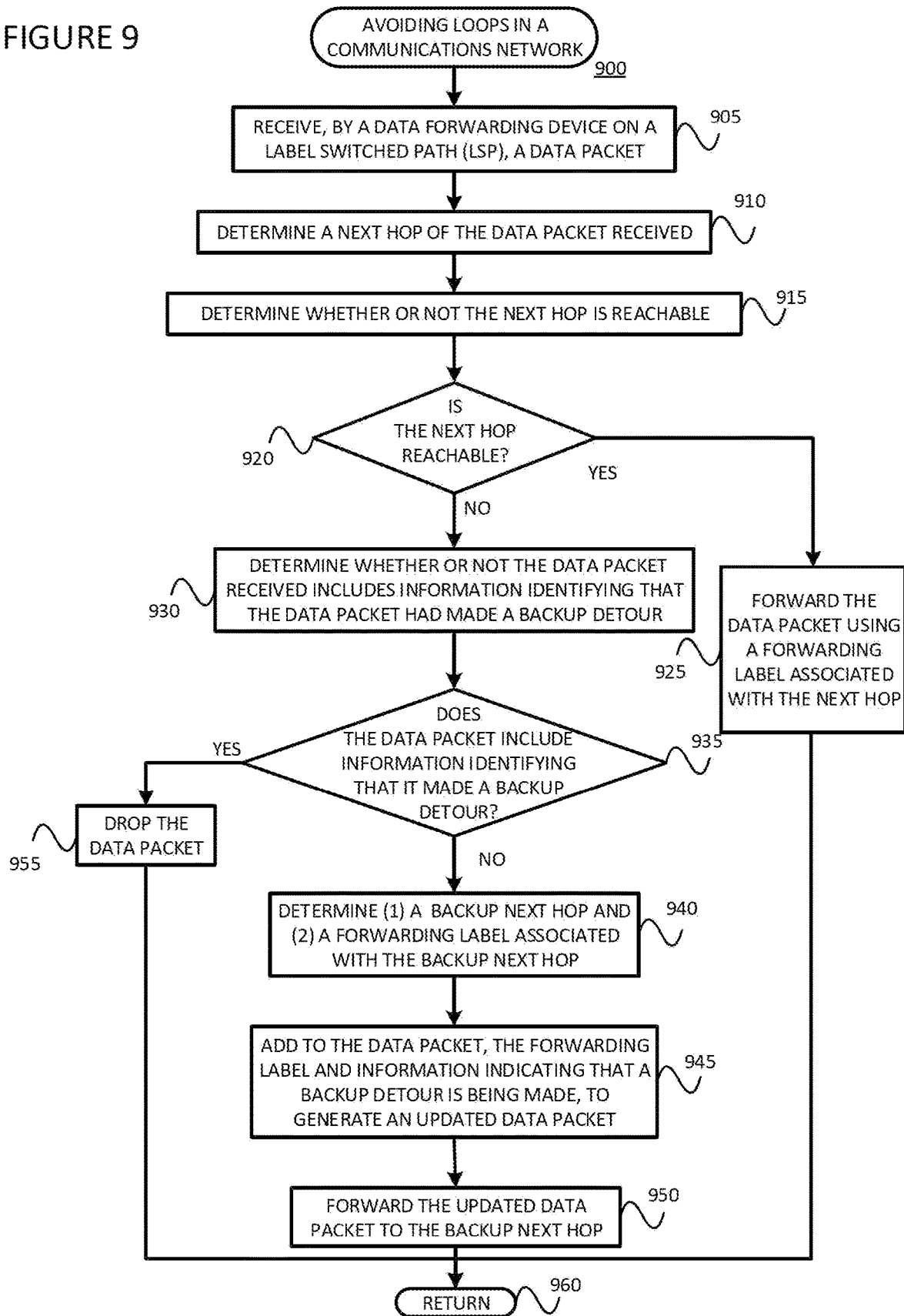
FIG. 9 is a flow diagram of an example method for avoiding loops in a communications network, in a manner consistent with the present description.

FIG. 9 is a flow diagram of an example method 900 for avoiding loops in a communications network. The example method 900 may be performed by a data forwarding device, such as a data forwarding device on an LSP. The data forwarding device receives a data packet (Block 905), determines a next hop of the data packet received (Block 910) and determines whether or not the next hop is reachable (Block 915).

Referring to decision block 920, if, on the one hand, it is determined that the next hop reachable, the data packet is forwarded using a forwarding label associated with the next hop (Decision 920=YES, and Block 925), before the example method 900 is left (Node 960). Note that the incoming label will have been swapped with the next hop label (in the case of a transit router on the LSP), or will have been popped (in the case of an egress router of the LSP, or in the case of a path defined by a segment routing (SR) based label stack). Referring back to decision block 920, if, on the other hand, it is determined that the next hop is not reachable (Decision 920=NO), the example method 900 determines whether or not the data packet received includes information identifying that the data packet had made a backup detour (earlier on the LSP). (Block 930)

Referring to decision block 935, if, on the one hand, it has been determined that the data packet received includes the information identifying that the data packet had made a backup detour (Decision 935=YES), the example method 900 drops the data packet (Block 955), before the example method 900 is left (Node 960). This is because dropping the packet may be preferred over the possibility of looping if more than one FRR occurs. Referring back to decision block 935, if on the other hand, it has been determined that the data packet received does not include information identifying that the data packet had made a backup detour (Decision 935=NO), a backup next hop and a forwarding label associated with the backup next hop are determined (Block 940), the forwarding label and information indicating that a backup detour is being made, is added to the received data packet to generate an updated data packet (Block 945), and the updated data packet is forwarded to the backup next hop (Block 950), before the example method 900 is left (Node 960) Note that the incoming label will have been swapped with the next hop label (in the case of a transit router on the LSP), or will have been popped (in the case of an egress router of the LSP, or in the case of a path defined by a segment routing (SR) based label stack).

Referring back to block 945, in some embodiments of example method 900, the act of adding to the data packet, the forwarding label and information indicating that a backup detour is being made, to generate an updated data packet, includes (1) replacing a forwarding label on the data packet received with the forwarding label associated with the backup next hop, and (2) pushing a label used to indicate that a backup detour is being made.

Referring back to block 945, in some embodiments of example method 900, the act of adding to the data packet, the forwarding label and information indicating that a backup detour is being made, to generate an updated data packet, includes (1) stacking the forwarding label associated with the backup next hop over a forwarding label on the data packet received, and (2) pushing a label used to indicate that a backup detour is being made. The label used to indicate that a backup detour is being made is to be removed (popped) if and when it reaches the top of the label stack. This will occur, for example, when the packet reaches the end of the backup detour (path or tunnel).

Referring back to block 945, in some embodiments of example method 900, the information indicating that a backup detour is being made is a special purpose label (SPL) (See, e.g., the document, K. Kompella, et al, "Allocating and Retiring Special-Purpose MPLS Labels," Request for Comments 7274 (Internet Engineering Task Force, June 2014) (referred to as "RFC 7274" and incorporated herein by reference).)(suggested value: 8, to be approved by the Internet Assigned Numbers Authority (TANA)), or an allocated label. Alternatively, an extended SPL may be used, whereby a pair of labels indicates that no further fast reroute is desired. However, in the case of SPRINGMPLS bypass tunnels of depth N, described in this application, the label stack would increase by 2*N, while using regular SPL(s) would only increase the stack by N labels.

In some embodiments of example method 900, the backup next hop points to a backup LSP, the backup LSP includes a plurality of data forwarding devices, and each of the data forwarding devices included in the backup LSP have used control signaling (e.g., IGP, BGP, etc.) to indicate that they are capable of processing the information indicating that a backup detour is being made.

In some embodiments of example method 900, the backup next hop is part of one of (A) a detour LSP, (B) a backup tunnel, (C) a bypass tunnel, (D) an NHOP bypass tunnel, (E) an NNHOP bypass tunnel, and (F) a backup LSP.

§ 4.2 Example Apparatus

Figure 10:
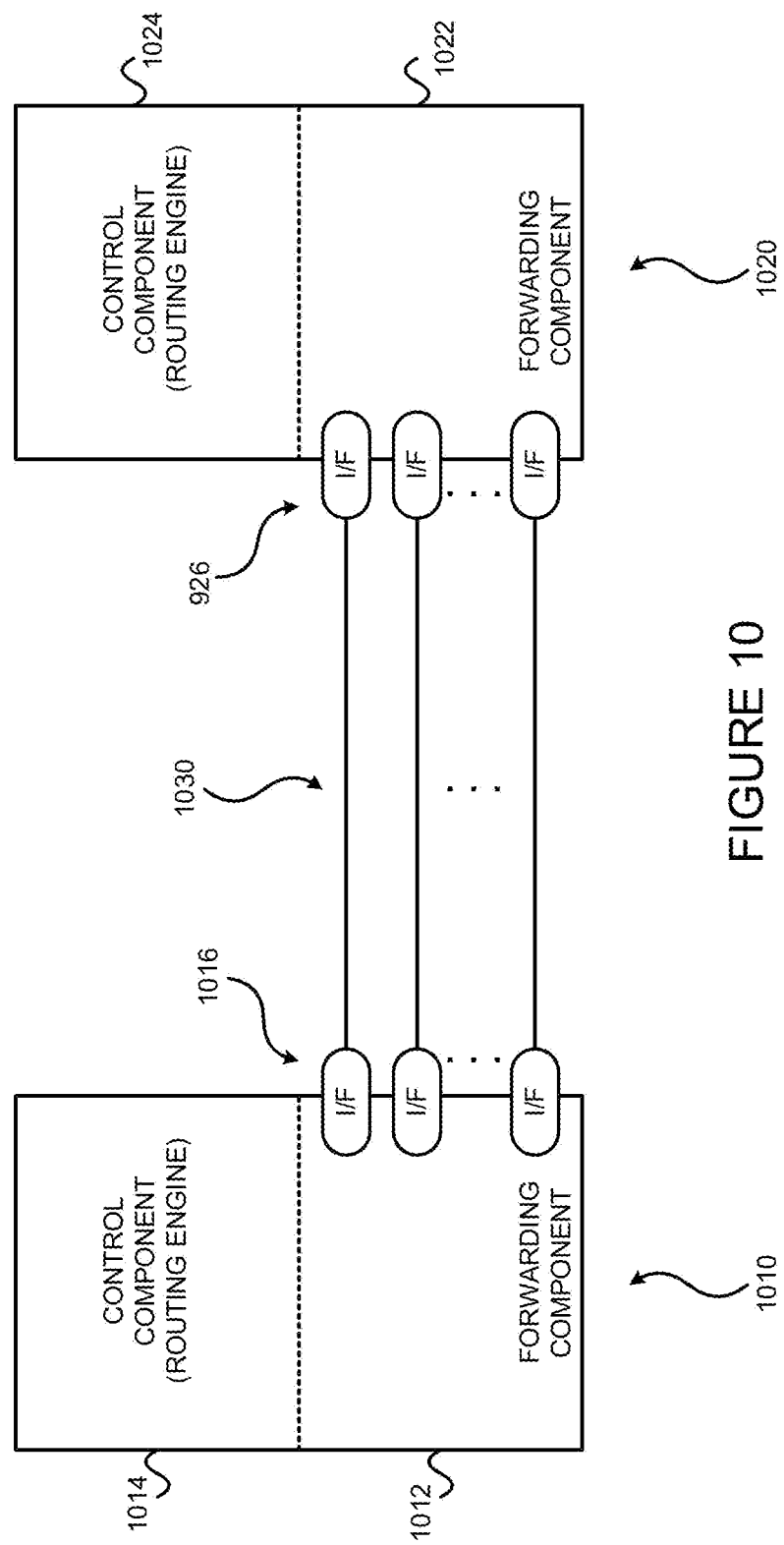
FIG. 10 illustrates two data forwarding systems, which may be used as nodes, coupled via communications links, in a communications network, such as communications network employing FRR.

The data communications network nodes may be forwarding devices, such as routers for example. FIG. 10 illustrates two data forwarding systems 1010 and 1020 coupled via communications links 1030. The links may be physical links or "wireless" links. The data forwarding systems 1010, 1020 may be routers for example. If the data forwarding systems 1010, 1020 are example routers, each may include a control component (e.g., a routing engine) 1014, 1024 and a forwarding component 1012, 1022. Each data forwarding system 1010, 1020 includes one or more interfaces 1016, 1026 that terminate one or more communications links 1030.

As just discussed above, and referring to FIG. 11, some example routers 1100 include a control component (e.g., routing engine) 1110 and a packet forwarding component (e.g., a packet forwarding engine) 1190.

The control component 1110 may include an operating system (OS) kernel 1120, routing protocol process(es) 1130, label-based forwarding protocol process(es) 1140, interface process(es) 1150, user interface (e.g., command line interface) process(es) 1160, and chassis process(es) 1170, and may store routing table(s) 1139, label forwarding information 1145, and forwarding (e.g., route-based and/or label-based) table(s) 1180. (Recall, e.g., FIGS. 4B, 5B, 6B, 7B, 7C and 8B-8D.) As shown, the routing protocol process(es) 1130 may support routing protocols such as the routing information protocol ("RIP") 1131, the intermediate system-to-intermediate system protocol ("IS-IS") 1132, the open shortest path first protocol ("OSPF") 1133, the enhanced interior gateway routing protocol ("EIGRP") 1134 and the border gateway protocol ("BGP") 1135, and the label-based forwarding protocol process(es) 1140 may support protocols such as BGP 1135, the label distribution protocol ("LDP") 1136, the resource reservation protocol ("RSVP") 1137, EVPN 1138 and L2VPN 1139. One or more components (not shown) may permit a user 1165 to interact with the user interface process(es) 1160. Similarly, one or more components (not shown) may permit an outside device to interact with one or more of the router protocol process(es) 1130, the label-based forwarding protocol process(es) 1140, the interface process(es) 1150, and the chassis process(es) 1170, via SNMP 1185, and such processes may send information to an outside device via SNMP 1185.

The packet forwarding component 1190 may include a microkernel 1192 over hardware components (e.g., ASICs, switch fabric, optics, etc.) 1191, interface process(es) 1193, ASIC drivers 1194, chassis process(es) 1195 and forwarding (e.g., route-based and/or label-based) table(s) 1196.

Figure 11:
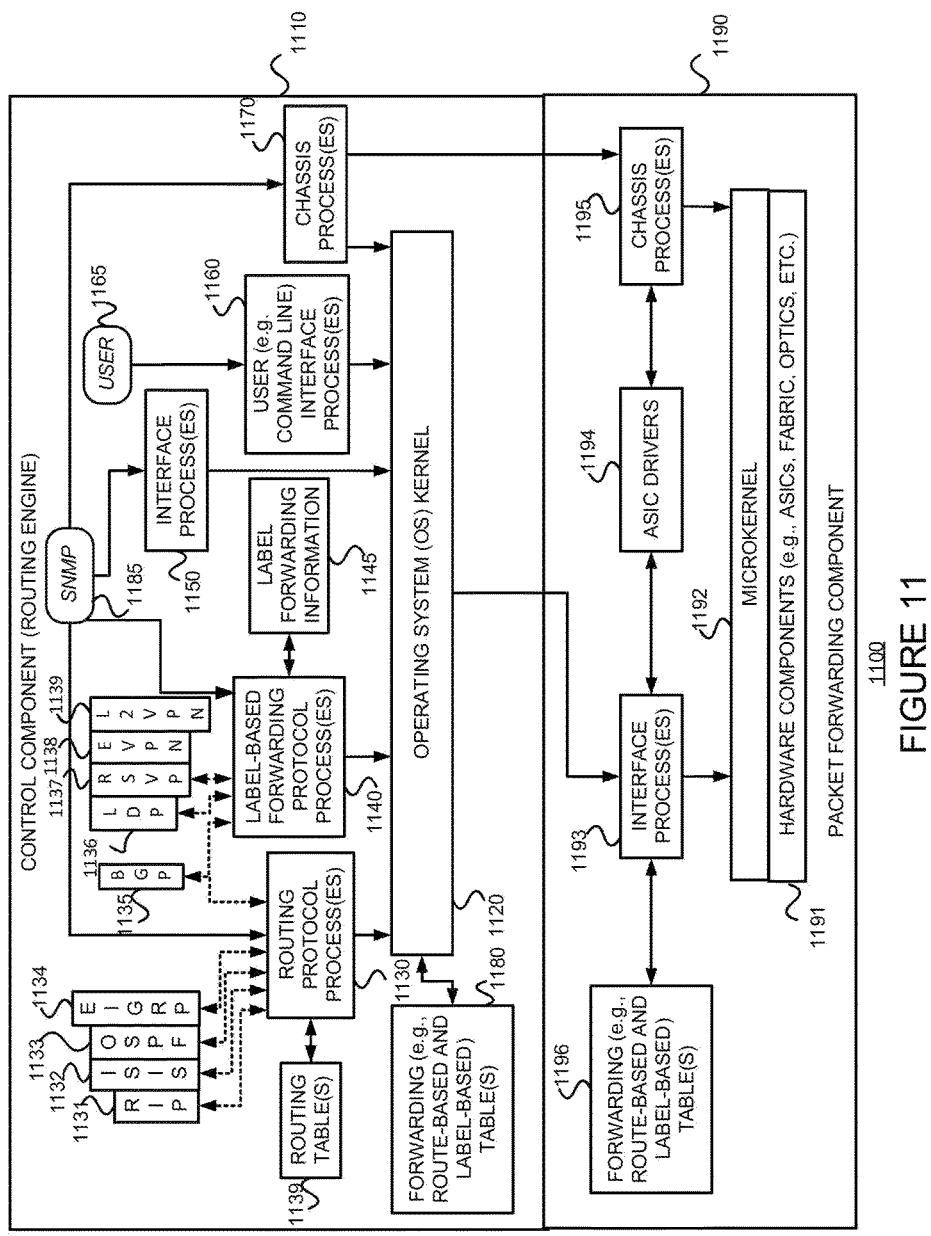
FIG. 11 is a block diagram of a router which may be used a communications network, such as communications network employing FRR.

In the example router 1100 of FIG. 11, the control component 1110 handles tasks such as performing routing protocols, performing label-based forwarding protocols, control packet processing, etc., which frees the packet forwarding component 1190 to forward received packets quickly. That is, received control packets (e.g., routing protocol packets and/or label-based forwarding protocol packets) are not fully processed on the packet forwarding component 1190 itself, but are passed to the control component 1110, thereby reducing the amount of work that the packet forwarding component 1190 has to do and freeing it to process packets to be forwarded efficiently. Thus, the control component 1110 is primarily responsible for running routing protocols and/or label-based forwarding protocols, maintaining the routing tables and/or label forwarding information, sending forwarding table updates to the packet forwarding component 1190, and performing system management. The example control component 1110 may handle routing protocol packets, provide a management interface, provide configuration management, perform accounting, and provide alarms. The processes 1130, 1140, 1150, 1160 and 1170 may be modular, and may interact with the OS kernel 1120. That is, nearly all of the processes communicate directly with the OS kernel 1120. Using modular software that cleanly separates processes from each other isolates problems of a given process so that such problems do not impact other processes that may be running. Additionally, using modular software facilitates easier scaling.

Still referring to FIG. 11, the example OS kernel 1120 may incorporate an application programming interface ("API") system for external program calls and scripting capabilities. The control component 1110 may be based on an Intel PCI platform running the OS from flash memory, with an alternate copy stored on the router's hard disk. The OS kernel 1120 is layered on the Intel PCI platform and establishes communication between the Intel PCI platform and processes of the control component 1110. The OS kernel 1120 also ensures that the forwarding tables 1196 in use by the packet forwarding component 1190 are in sync with those 1180 in the control component 1110. Thus, in addition to providing the underlying infrastructure to control component 1110 software processes, the OS kernel 1120 also provides a link between the control component 1110 and the packet forwarding component 1190.

Referring to the routing protocol process(es) 1130 of FIG. 11, this process(es) 1130 provides routing and routing control functions within the platform. In this example, the RIP 1131, ISIS 1132, OSPF 1133 and EIGRP 1134 (and BGP 1135) protocols are provided. Naturally, other routing protocols may be provided in addition, or alternatively. Similarly, the label-based forwarding protocol process(es) 1140 provides label forwarding and label control functions. In this example, the LDP 1136, RSVP 1137, EVPN 1138 and L2VPN 1139 (and BGP 1135) protocols are provided. Naturally, other label-based forwarding protocols (e.g., MPLS, SR, etc.) may be provided in addition, or alternatively. In the example router 1100, the routing table(s) 1139 is produced by the routing protocol process(es) 1130, while the label forwarding information 1145 is produced by the label-based forwarding protocol process(es) 1140.

Still referring to FIG. 11, the interface process(es) 1150 performs configuration of the physical interfaces and encapsulation.

The example control component 1110 may provide several ways to manage the router. For example, it 1110 may provide a user interface process(es) 1160 which allows a system operator 1165 to interact with the system through configuration, modifications, and monitoring. The SNMP 1185 allows SNMP-capable systems to communicate with the router platform. This also allows the platform to provide necessary SNMP information to external agents. For example, the SNMP 1185 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 1110, thereby avoiding slowing traffic forwarding by the packet forwarding component 1190.

Although not shown, the example router 1100 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 1160 via a console port, an auxiliary port, and/or a management Ethernet port.

The packet forwarding component 1190 is responsible for properly outputting received packets as quickly as possible. If there is no entry in the forwarding table for a given destination or a given label and the packet forwarding component 1190 cannot perform forwarding by itself, it 1190 may send the packets bound for that unknown destination off to the control component 1110 for processing. The example packet forwarding component 1190 is designed to perform Layer 2 and Layer 3 switching, route lookups, and rapid packet forwarding.

As shown in FIG. 11, the example packet forwarding component 1190 has an embedded microkernel 1192 over hardware components 1191, interface process(es) 1193, ASIC drivers 1194, and chassis process(es) 1195, and stores a forwarding (e.g., route-based and/or label-based) table(s) 1196. The microkernel 1192 interacts with the interface process(es) 1193 and the chassis process(es) 1195 to monitor and control these functions. The interface process(es) 1192 has direct communication with the OS kernel 1120 of the control component 1110. This communication includes forwarding exception packets and control packets to the control component 1110, receiving packets to be forwarded, receiving forwarding table updates, providing information about the health of the packet forwarding component 1190 to the control component 1110, and permitting configuration of the interfaces from the user interface (e.g., CLI) process(es) 1160 of the control component 1110. The stored forwarding table(s) 1196 is static until a new one is received from the control component 1110. The interface process(es) 1193 uses the forwarding table(s) 1196 to look up next-hop information. The interface process(es) 1193 also has direct communication with the distributed ASICs. Finally, the chassis process(es) 1195 may communicate directly with the microkernel 1192 and with the ASIC drivers 1194.

Figure 12:
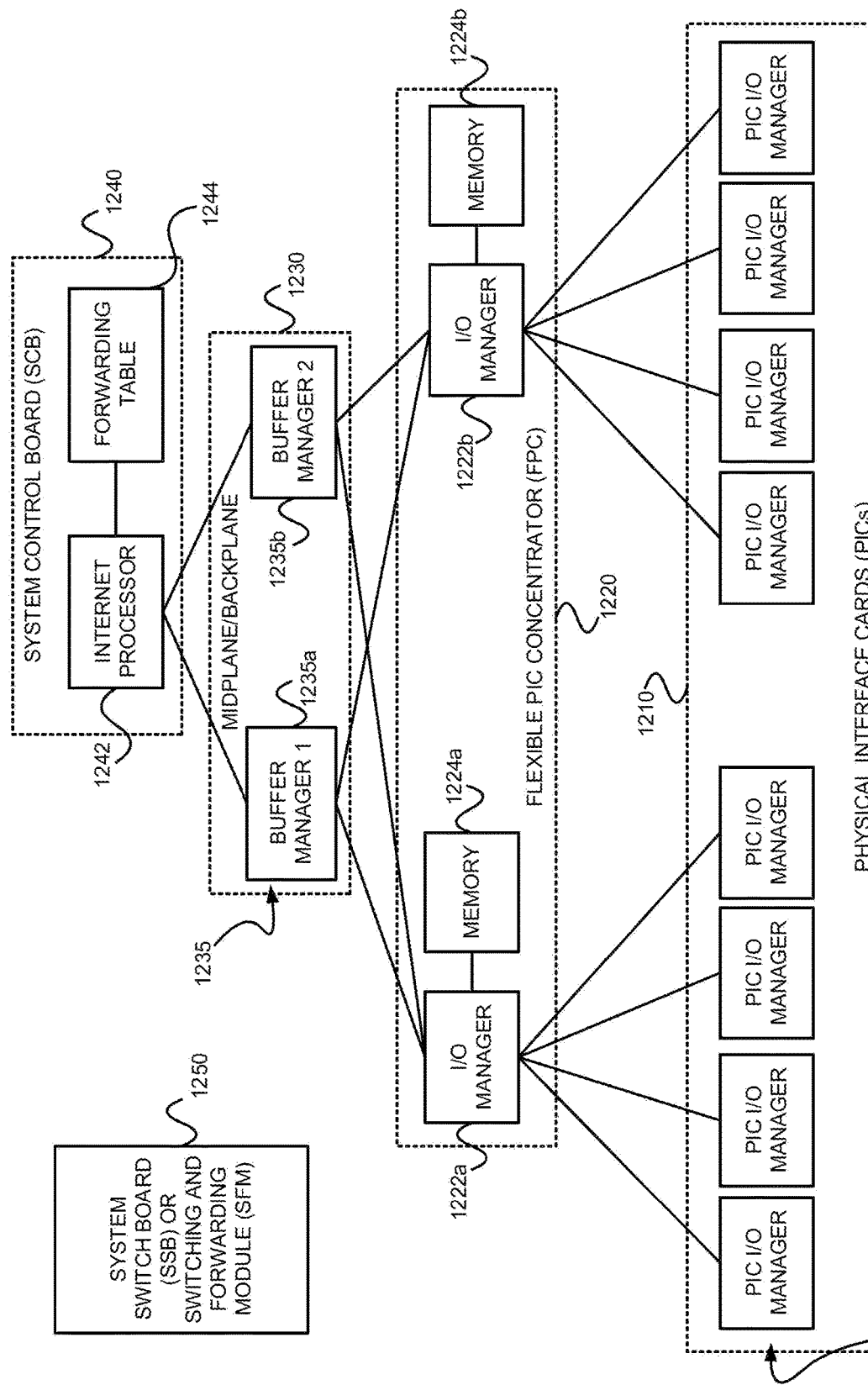
FIG. 12 is an example architecture in which ASICS may be distributed in a packet forwarding component to divide the responsibility of packet forwarding.

FIG. 12 is an example of how the ASICS may be distributed in the packet forwarding component 1190 to divide the responsibility of packet forwarding. As shown in FIG. 12, the ASICs of the packet forwarding component 1190 may be distributed on physical interface cards ("PICs") 1210, flexible PIC concentrators ("FPCs") 1220, a midplane or backplane 1230, and a system control board(s) 1240 (for switching and/or forwarding). Switching fabric is also shown as a system switch board ("SSB"), or a switching and forwarding module ("SFM") 1250. Each of the PICs 1210 includes one or more PIC I/O managers 1215. Each of the FPCs 1220 includes one or more I/O managers 1222, each with an associated memory 1224. The midplane/backplane 1230 includes buffer managers 1235a, 1235b. Finally, the system control board 1240 includes an internet processor 1242 and an instance of the forwarding table 1244 (Recall, e.g., 1196 of FIG. 11).

Still referring to FIG. 12, the PICs 1210 contain the interface ports. Each PIC 1210 may be plugged into an FPC 1220. Each individual PIC 1210 may contain an ASIC that handles media-specific functions, such as framing or encapsulation. Some example PICs 1210 provide SDH/SONET, ATM, Gigabit Ethernet, Fast Ethernet, and/or DS3/E3 interface ports.

An FPC 1220 can contain from one or more PICs 1210, and may carry the signals from the PICs 1210 to the midplane/backplane 1230 as shown in FIG. 12.

The midplane/backplane 1230 holds the line cards. The line cards may connect into the midplane/backplane 1230 when inserted into the example router's chassis from the front. The control component (e.g., routing engine) 1110 may plug into the rear of the midplane/backplane 1230 from the rear of the chassis. The midplane/backplane 1230 may carry electrical (or optical) signals and power to each line card and to the control component 1110.

The system control board 1240 may perform forwarding lookup. It 1240 may also communicate errors to the routing engine. Further, it 1240 may also monitor the condition of the router based on information it receives from sensors. If an abnormal condition is detected, the system control board 1240 may immediately notify the control component 1110.

Referring to FIGS. 12, 13A and 13B, in some exemplary routers, each of the PICs 1210, 1110' contains at least one I/O manager ASIC 1215 responsible for media-specific tasks, such as encapsulation. The packets pass through these I/O ASICs on their way into and out of the router. The I/O manager ASIC 1215 on the PIC 1210, 1110' is responsible for managing the connection to the I/O manager ASIC 1222 on the FPC 1220, 1120', managing link-layer framing and creating the bit stream, performing cyclical redundancy checks (CRCs), and detecting link-layer errors and generating alarms, when appropriate. The FPC 1220 includes another I/O manager ASIC 1222. This ASIC 1222 takes the packets from the PICs 1210 and breaks them into (e.g., 74-byte) memory blocks. This FPC I/O manager ASIC 1222 sends the blocks to a first distributed buffer manager (DBM) 1235a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 1235a' manages and writes packets to the shared memory 1224 across all FPCs 1220. In parallel, the first DBM ASIC 1235a' also extracts information on the destination of the packet and passes this forwarding-related information to the Internet processor 1242/1142'. The Internet processor 1242/1142' performs the route lookup using the forwarding table 1244 and sends the information over to a second DBM ASIC 1235b'. The Internet processor ASIC 1242/1142' also collects exception packets (i.e., those without a forwarding table entry) and sends them to the control component 1110. The second DBM ASIC 1235b' then takes this information and the 74-byte blocks and forwards them to the I/O manager ASIC 1222 of the egress FPC 1220/1120' (or multiple egress FPCs, in the case of multicast) for reassembly. (Thus, the DBM ASICs 1235a' and 1235b' are responsible for managing the packet memory 1224 distributed across all FPCs 1220/1120', extracting forwarding-related information from packets, and instructing the FPC where to forward packets.)

The I/O manager ASIC 1222 on the egress FPC 1220/1120' may perform some value-added services. In addition to incrementing time to live ("TTL") values and re-encapsulating the packet for handling by the PIC 1210, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 1222 on the egress FPC 1220/1120' may be responsible for receiving the blocks from the second DBM ASIC 1235b', incrementing TTL values, queuing a pointer to the packet, if necessary, before applying CoS rules, re-encapsulating the blocks, and sending the encapsulated packets to the PIC I/O manager ASIC 1215.

Figure 14:
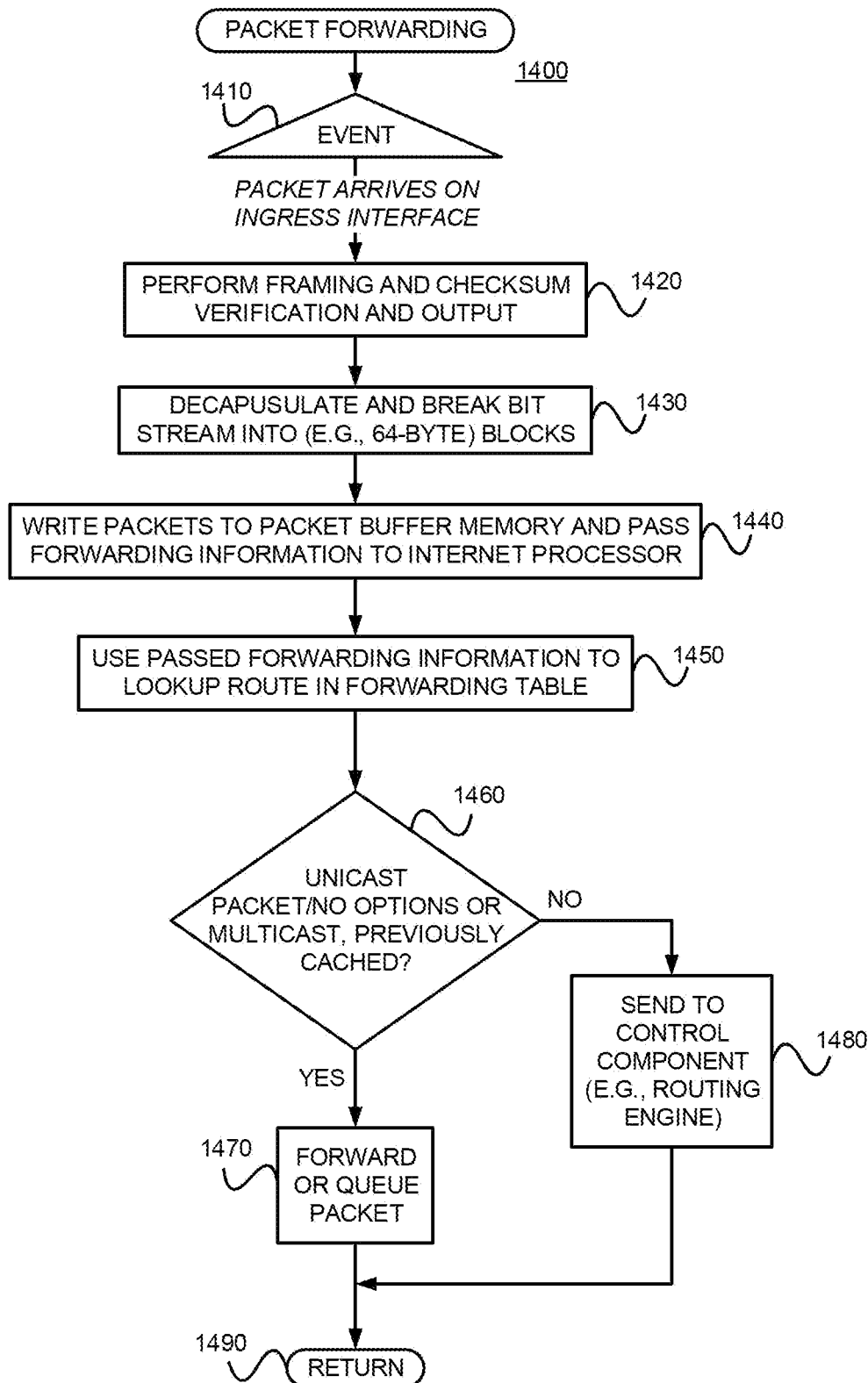
FIG. 14 is a flow diagram of an example method for providing packet forwarding in an example router.

FIG. 14 is a flow diagram of an example method 1400 for providing packet forwarding in the example router. The main acts of the method 1400 are triggered when a packet is received on an ingress (incoming) port or interface. (Event 1410) The types of checksum and frame checks that are required by the type of medium it serves are performed and the packet is output, as a serial bit stream. (Block 1420) The packet is then decapsulated and parsed into (e.g., 64-byte) blocks. (Block 1430) The packets are written to buffer memory and the forwarding information is passed on the Internet processor. (Block 1440) The passed forwarding information is then used to lookup a route in the forwarding table. (Block 1450) Note that the forwarding table can typically handle unicast packets that do not have options (e.g., accounting) set, and multicast packets for which it already has a cached entry. Thus, if it is determined that these conditions are met (YES branch of Decision 1460), the packet forwarding component finds the next hop and egress interface, and the packet is forwarded (or queued for forwarding) to the next hop via the egress interface (Block 1470) before the method 1400 is left (Node 1490) Otherwise, if these conditions are not met (NO branch of Decision 1460), the forwarding information is sent to the control component 1110 for advanced forwarding resolution (Block 1480) before the method 1400 is left (Node 1490).

Referring back to block 1470, the packet may be queued. Actually, as stated earlier with reference to FIG. 12, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 1222 may send a request for the packet to the second DBM ASIC 1235b. The DBM ASIC 1235 reads the blocks from shared memory and sends them to the I/O manager ASIC 1222 on the FPC 1220, which then serializes the bits and sends them to the media-specific ASIC of the egress interface. The I/O manager ASIC 1215 on the egress PIC 1210 may apply the physical-layer framing, perform the CRC, and send the bit stream out over the link.

Referring back to block 1480 of FIG. 14, as well as FIG. 12, regarding the transfer of control and exception packets, the system control board 1240 handles nearly all exception packets. For example, the system control board 1240 may pass exception packets to the control component 1110.

Although example embodiments consistent with the present description may be implemented on the example routers of FIG. 10 or 11, embodiments consistent with the present description may be implemented on communications network nodes (e.g., routers, switches, etc.) having different architectures. More generally, embodiments consistent with the present description may be implemented on an example system 1400 as illustrated on FIG. 15.

Figure 15:
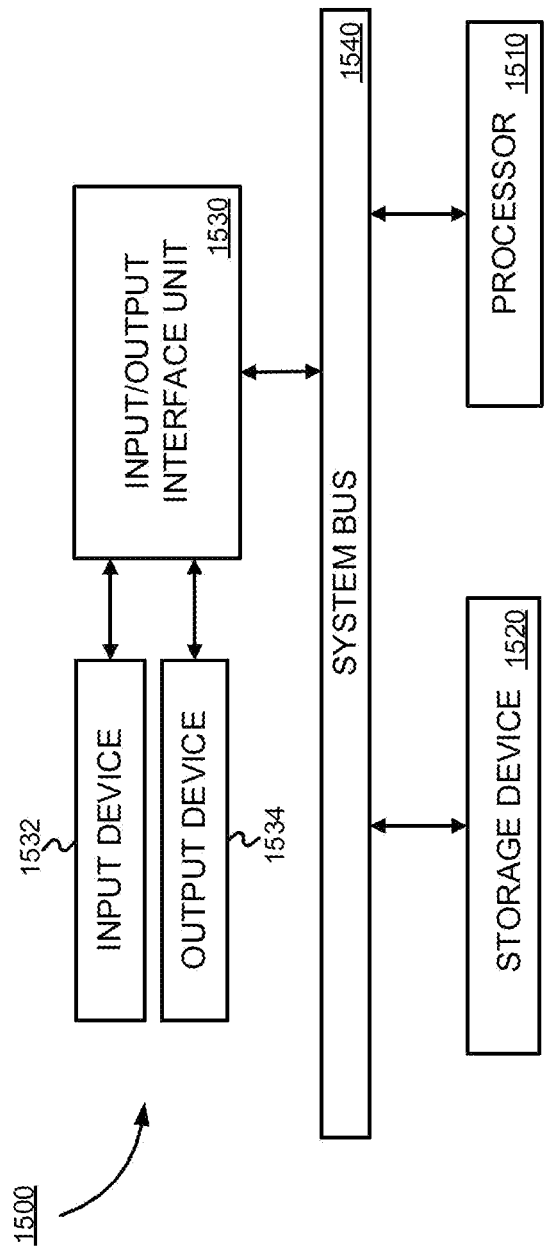
FIG. 15 is a block diagram of an exemplary machine that may perform one or more of the processes described, and/or store information used and/or generated by such processes.

FIG. 15 is a block diagram of an exemplary machine 1500 that may perform one or more of the processes described, and/or store information used and/or generated by such processes. The exemplary machine 1500 includes one or more processors 1510, one or more input/output interface units 1530, one or more storage devices 1520, and one or more system buses and/or networks 1540 for facilitating the communication of information among the coupled elements. One or more input devices 1532 and one or more output devices 1534 may be coupled with the one or more input/output interfaces 1530. The one or more processors 1510 may execute machine-executable instructions (e.g., C or C++ running on the Linux operating system widely available from a number of vendors) to effect one or more aspects of the present description. At least a portion of the machine executable instructions may be stored (temporarily or more permanently) on the one or more storage devices 1520 and/or may be received from an external source via one or more input interface units 1530. The machine executable instructions may be stored as various software modules, each module performing one or more operations. Functional software modules are examples of components of the present description.

In some embodiments consistent with the present description, the processors 1510 may be one or more microprocessors and/or ASICs. The bus 1540 may include a system bus. The storage devices 1520 may include system memory, such as read only memory (ROM) and/or random access memory (RAM). The storage devices 1520 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present description may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present description may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present description (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present description (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.3 Example Operations of Example Method(s)

Figures 4A, 4B:
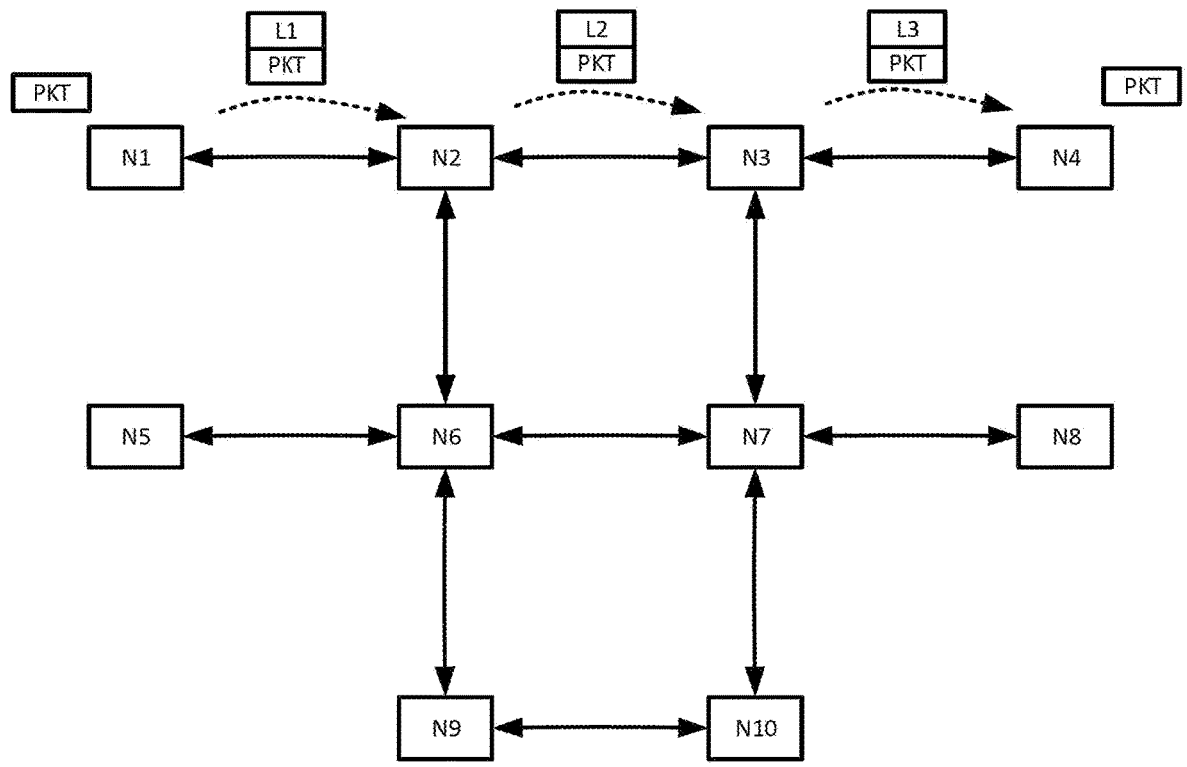
FIG. 4A illustrates an example of MPLS operations over a first LSP of an example network.
FIG. 4B illustrates a forwarding table for FIG. 4A.
Figures 5A, 5B:
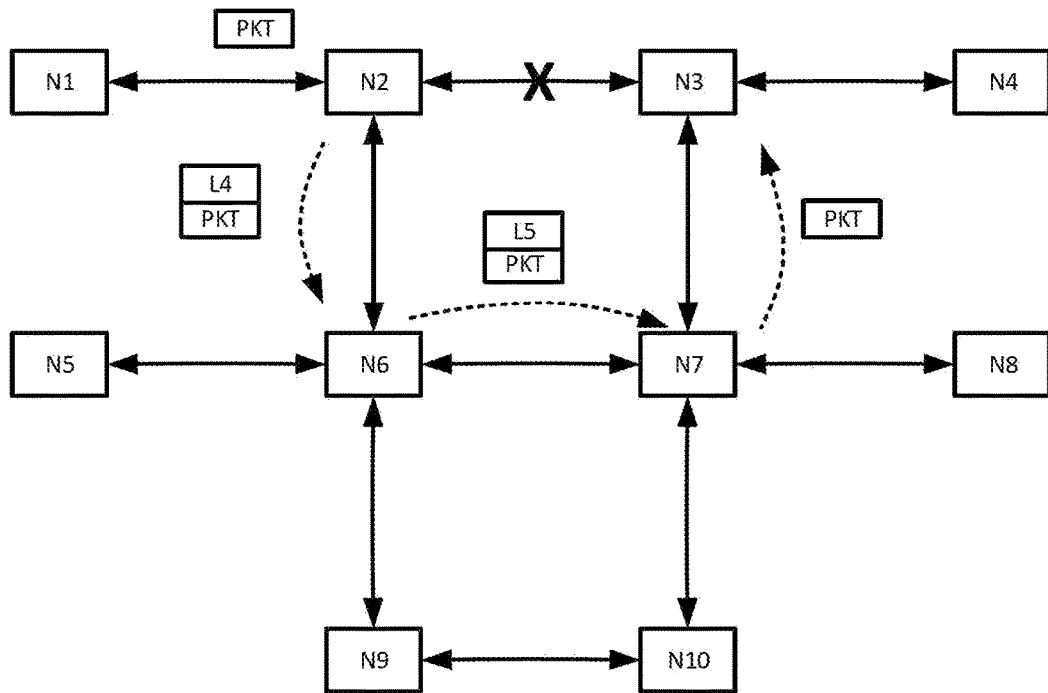
FIGS. 5A illustrates forwarding bypassing a failed link, which may be used in the example network of FIG. 4A.
FIG. 5B illustrates a forwarding table for protecting the failed link.
Figures 6A, 6B:
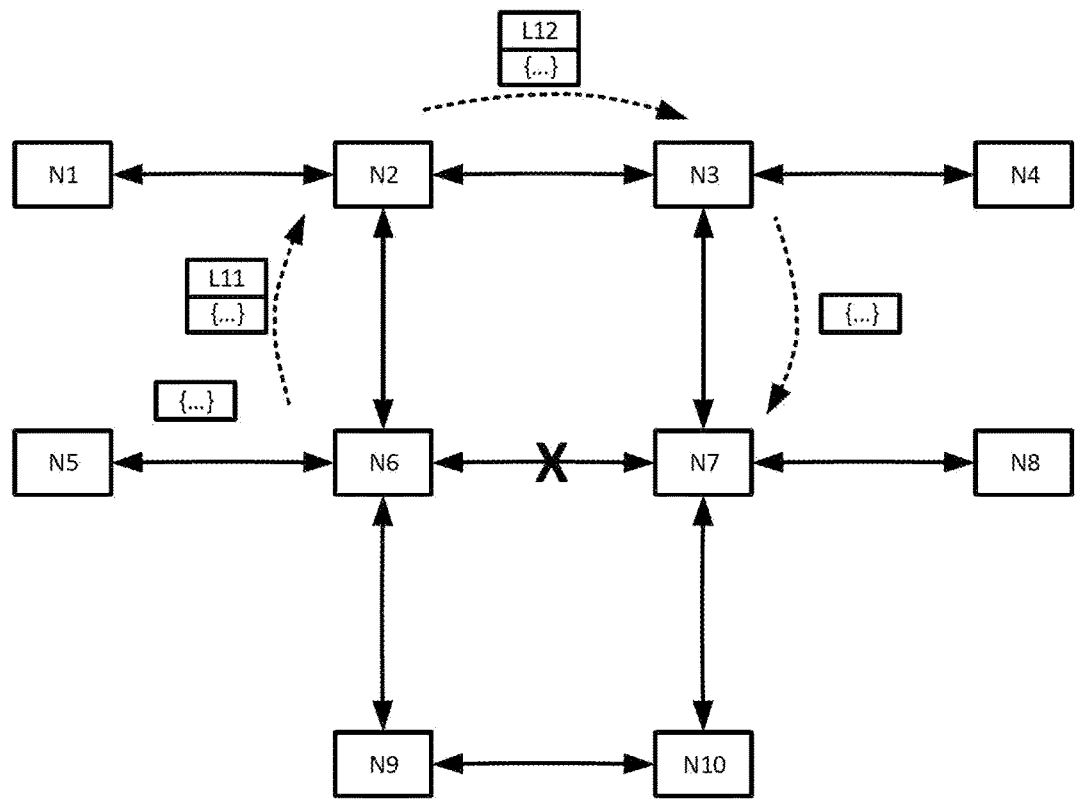
FIGS. 6A and 6B illustrate bypass operations in the example network of FIG. 4A, in the event of another single link failure.

FIGS. 16A-16D illustrate operations of the example method of FIG. 9 in the example network of FIG. 4A, in a situation in which both links N2-N3 and N6-N7 fail simultaneously. Referring to FIGS. 16A and 16B, the bypass LSP protecting link N2-N3 is invoked, and traffic is to be sent to N3 via N6 and N7. More specifically, when a packet (PKT) arrives at N1, N1 pushes label L1 onto the packet and sends the resulting labeled packet (L1-PKT) to next hop N2. (Recall, e.g., blocks 905, 910, 915, 920=YES, and 925 of FIG. 9.) Since the N2-N3 link has failed, after swapping label L1 for label L2, N2 uses the bypass forwarding table of FIG. 16C to push label L4 onto the stack, adds information indicating that a backup detour is being made (e.g., adds a special purpose No Further Fast Reroute (NFFRR) label) and sends the resulting data (L4-NFFRR-L2-PKT) to next hop N6. (Recall, e.g., 905, 910, 915, 920=NO, 930, 935=NO, 940, 945 and 950 of FIG. 9.) Since the N6-N7 link has failed, instead of simply swapping label L4 for label L5, and sending the result to next hop N7, N6 determines whether or not the data packet received includes information identifying that the data packet had (already) made a backup detour. (Recall, e.g., 905, 910, 915, 920=NO, and 930 of FIG. 9.) Since, in this case, the received packet does include information identifying that the data packet has (already) made a backup detour (e.g., the NFFRR special label), the packet is dropped. (Recall, e.g., 935=YES, and 955 of FIG. 9.)

Comparing the example operations of FIGS. 16-16D with those of FIGS. 8A-8D, although the packet is dropped, looping of the packet between N2 and N6 is avoided.

Figures 17A, 17B, 17C:
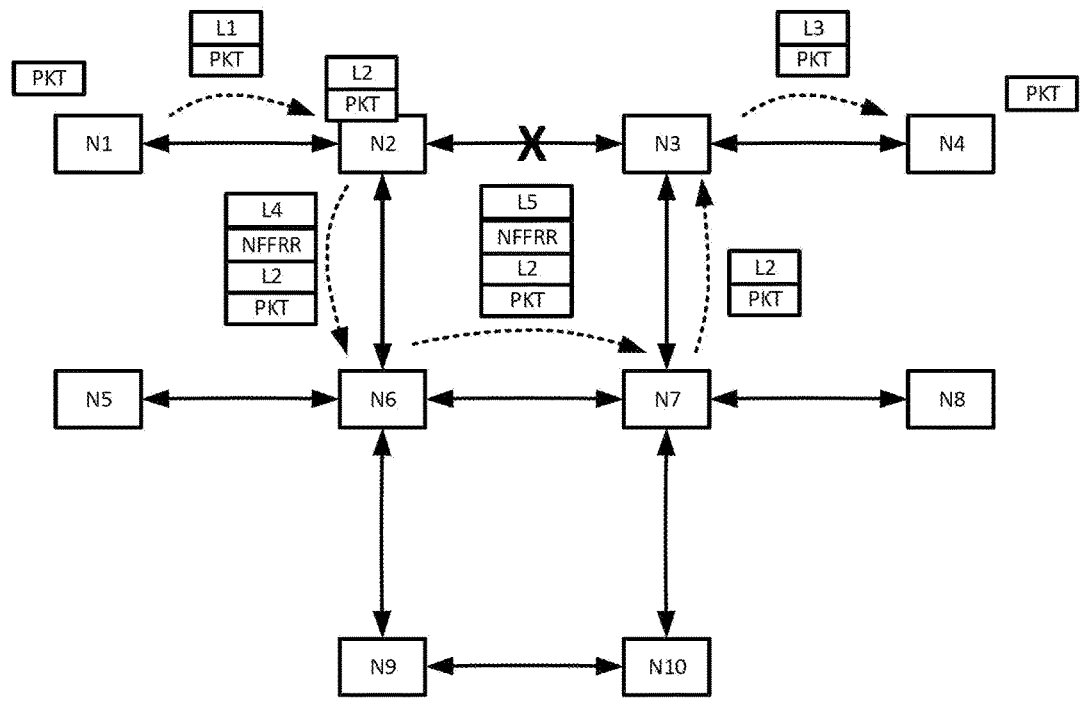
FIGS. 17A-17C illustrate operations of the example method of FIG. 9 in the example network of FIG. 4A.

FIGS. 17A-17C illustrate operations of the example method of FIG. 9 in the example network of FIG. 4, in a situation in which link N2-N3 has failed, but there is no second FRR needed. Referring to FIGS. 17A and 17C, the bypass LSP protecting link N2-N3 is invoked, and traffic is to be sent to N3 via N6 and N7. More specifically, when a packet (PKT) arrives at N1, N1 pushes label L1 onto the packet and sends the resulting labeled packet (L1-PKT) to next hop N2. (Recall, e.g., blocks 905, 910, 915, 920=YES, and 925 of FIG. 9.) Since the N2-N3 link has failed, after swapping label L1 for label L2, N2 uses the bypass forwarding table of FIG. 17C to push label L4 onto the stack, adds information indicating that a backup detour is being made (e.g., adds a special purpose No Further Fast Reroute (NFFRR) label) and sends the resulting data (L4-NFFRR-L2-PKT) to next hop N6. (Recall, e.g., 905, 910, 915, 920=NO, 930, 935=NO, 940, 945 and 950 of FIG. 9.) N6 then swaps label L4 for label L5 and sends the resulting data (L5-NFFRR-L2-PKT) to next hop N7. (Recall, e.g., 905, 910, 915, 920=YES, and 925 of FIG. 9.) N7 then pops label L5 and the NFFRR special label, and sends the resulting labeled packet (L2-PKT) to next hop N3. (Recall, e.g., 905, 910, 915, 920=YES, and 925 of FIG. 9.) N3 then swaps label L2 for label L3 and forwards the resulting labeled packet (L3-PKT) to next hop N4. (Recall, e.g., 905, 910, 915, 920=YES, and 925 of FIG. 9.) N4 then pops the label L3 and forwards the resulting packet (PKT) towards its destination based on further information (not shown) in its forwarding table.

Figures 7A, 7B, 7C:
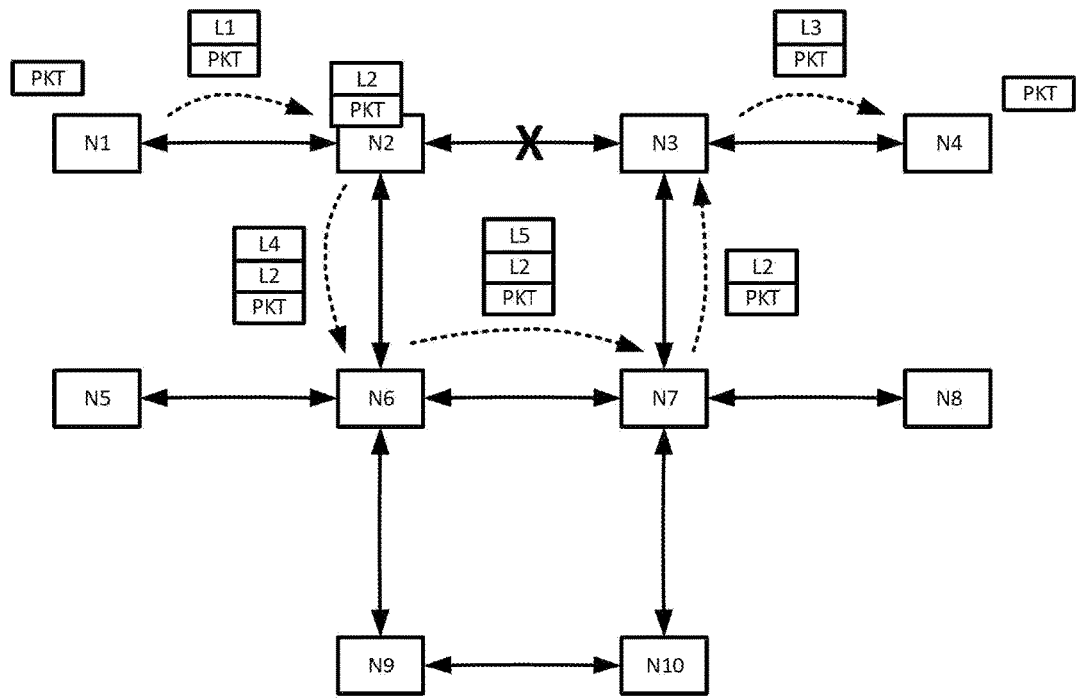
FIGS. 7A-7C illustrate bypass operations in the example network of FIG. 4A, in the event of a single link failure.

Comparing FIGS. 17A-17C with FIGS. 7A-7C, as this example demonstrates, when looping is not a potential problem, the example method 900 has no effect on forwarding (other than adding and later popping a special NFFRR label). That is, the information indicating that a fast reroute has occurred (e.g., special label NFFRR) is added, and then removed.

§ 4.4 Refinements, Alternatives and Extensions

Referring back to block 945 of FIG. 9, besides the transport label required for the backup next-hop, there could be another label (e.g., a "service label"). Such a service label may be needed for the service that the network provides, and the service runs on top of the transport LSP such as EVPN, VPLS, or L3VPN, etc.

Although some embodiments were described in the context of FRR, which usually uses RSVP-TE to strictly pre-compute bypass paths, other ways of computing bypass paths (See, e.g., the documents, A. Atlas, Ed., "Basic Specification for IP Fast Reroute: Loop-Free Alternates," Request for Comments 5286 (Internet Engineering Task Force, September 2008)(referred to as "RFC 5286" and incorporated herein by reference), S. Bryant, et al., "Remote Loop-Free Alternate (LFA) Fast Reroute (FRR)," Request for Comments 7490 (Internet Engineering Task Force, April 2015) (referred to as "RFC 7490" and incorporated herein by reference), and S. Litkowski, et al., "Topology Independent Fast Reroute using Segment Routing," draft-ietf-rtgwg-segment-routing-ti-lfa-01 (Internet Engineering Task Force, Mar. 5, 2019)(referred to as "the TI-LFA draft" and incorporated herein by reference).) may be used instead. That is, although some example embodiments are applicable to protection schemes using a bypass tunnel, they can be instead applied to protection schemes using LFA, or any of its variants.

A node's capability to implement the foregoing example method may be communicated. In this way, if a node in an LSP is not configured to perform such an example method, an upstream node might not perform the method since a packet with a special purpose label (SPL) (e.g., a NFFRR label) may be discarded if the SPL is not understood. IGP, BGP, etc. may be used to signal capabilities. Three possible ways of signaling NFFRR capability—for MPLS Services with BGP, for MPLS Services with Targeted LDP, and for MPLS Forwarding—are now described.

First, as described in the appendix of the '101 provisional, an ideal choice for signaling NFFRR capability for MPLS Services with BGP would be an attribute consisting of a bit vector, one bit of which would be the capability of processing the NFFRR SPL below the BGP service label. This could be used by BGP L2VPN, BGP VPLS, EVPN, E-Tree and E-VPWS. An alternative is to use the BGP Capabilities Optional Parameter.

Second, one approach to signaling NFFRR capability for MPLS services signaled with targeted LDP is to introduce a new LDP TLV called the NFFRR Capability TLV as an Optional Parameter in the Label Mapping Message. (See, e.g., the document, L. Andersson, Ed., "LDP Specification," *Request for Comments* 5036 (Internet Engineering Task Force, October 2007)(referred to as "RFC 5036" and incorporated herein by reference).) This TLV has Type TBD (suggested: 0x0207, to be approved by IANA) and Length 0. Another approach is to use LDP Capabilities. (See, e.g., the document, B. Thomas, "LDP Capabilities," Request for Comments 5561 (Internet Engineering Task Force, July 2009) (referred to as "RFC 5561" and incorporated herein by reference).) This approach has the advantage that it deals with capabilities on a node basis, rather than on a per label mapping basis. However, there don't appear to be other documents using this approach.

Third, a router's ability to process the NFFRR SPL could be signaled using the Link State Router TE Node Capabilities (See, e.g., the document, J. P. Vasseur and J. L. Le Roux, Eds., "IGP Routing Protocol Extensions for Discovery of Traffic Engineering Node Capabilities," Request for Comments 5073 (Internet Engineering Task Force, December 2007)(referred to as "RFC 5073" and incorporated herein by reference).), which works for both Intermediate System-Intermediate System (IS-IS) and open shortest path first (OSPF) interior gateway protocols (IGPs). A new TE Node Capability bit, the N bit (suggested value: 5, to be approved by IANA) indicates that the advertising node is capable of processing the NFFRR SPL.

Although it is not necessary, it is advantageous to implement at much as the example method as possible in the data or forwarding plane (Recall, e.g., 1012 and 1022 of FIGS. 10 and 1190 of FIG. 11.) (instead of in the control plane) of a data forwarding device.

Although the example method 900 was described in the context of MPLS, it may also be used in network employing Segment Routing (SR). However, its use in SR domains can become expensive in terms of memory and label overhead. More specifically, as noted above with reference to FIGS. 5A and 5B, the bypass tunnel may be set up using SPRING stacks. (Recall, e.g., the SR MPLS draft.) Suppose that the bypass tunnel N2-N6-N7-N3 were instantiated using SPRINGMPLS (See, e.g., the document A. Bashandy and C. Filsfils, Eds., "Segment Routing with the MPLS Data Plane," Request for Comments 8660 (Internet Engineering Task Force, December 2019) (referred to as "RFC 8660" and incorporated herein by reference), and in particular, using adjacency SIDs. When N2 receives the packet, it will swap label L1 with L2. If the corresponding labels for links N6-N7 and N7-N3 were L20 and L21, the bypass would include pushing the label stack (L20-L21) onto the packet and sending the packet to N6. To indicate that FRR has already occurred and to drop the packet rather than to try to protect the packet again, N2 would have to push (L20-NFFRR-L21-NFFRR) onto the packet before sending it to N6. If the packet came from N1 with label L1, after swapping L1 with L2, N2 would send a packet with label stack (L20-NFFRR-L21NFFRR-L2) to N6.

N6 would see the label L20, pop it, note the NFFRR label and pop it, then attempt to send the packet to N7. If the link N6-N7 is down, N6 drops the packet due to the presence of the NFFRR label. Otherwise, N7 will receive the packet, sees L21, pops it, sees NFFRR, pops it and tries to send the packet to N3. If link N7-N3 is down, N7 drops the packet due to the presence of the NFFRR label. Otherwise, N3 gets the packet with L2, swaps it with label L3 and sends it to N4.

Note that with SPRINGMPLS, the NFFRR label needs to be repeated for each label in the bypass stack. Thus, a "regular" SPL may be preferred over an "extended" SPL.

Figure 1:
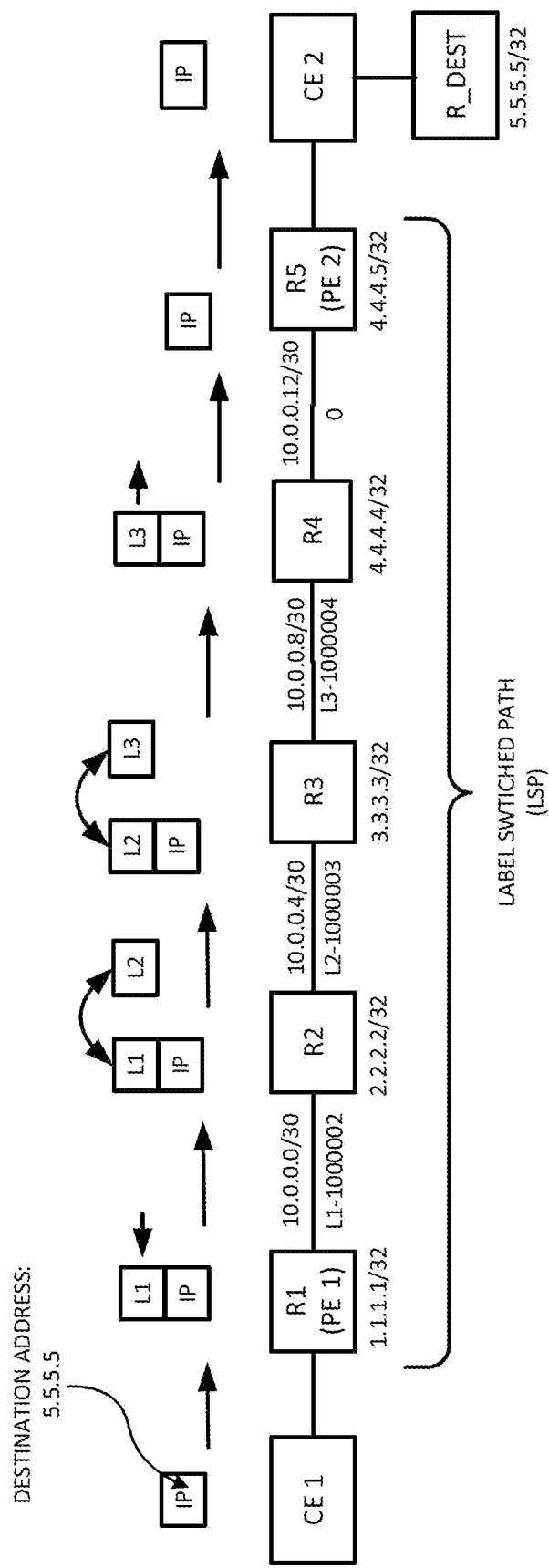
FIG. 1 illustrates an example of MPLS operations over an LSP between an ingress router and an egress router.
Figure 2:
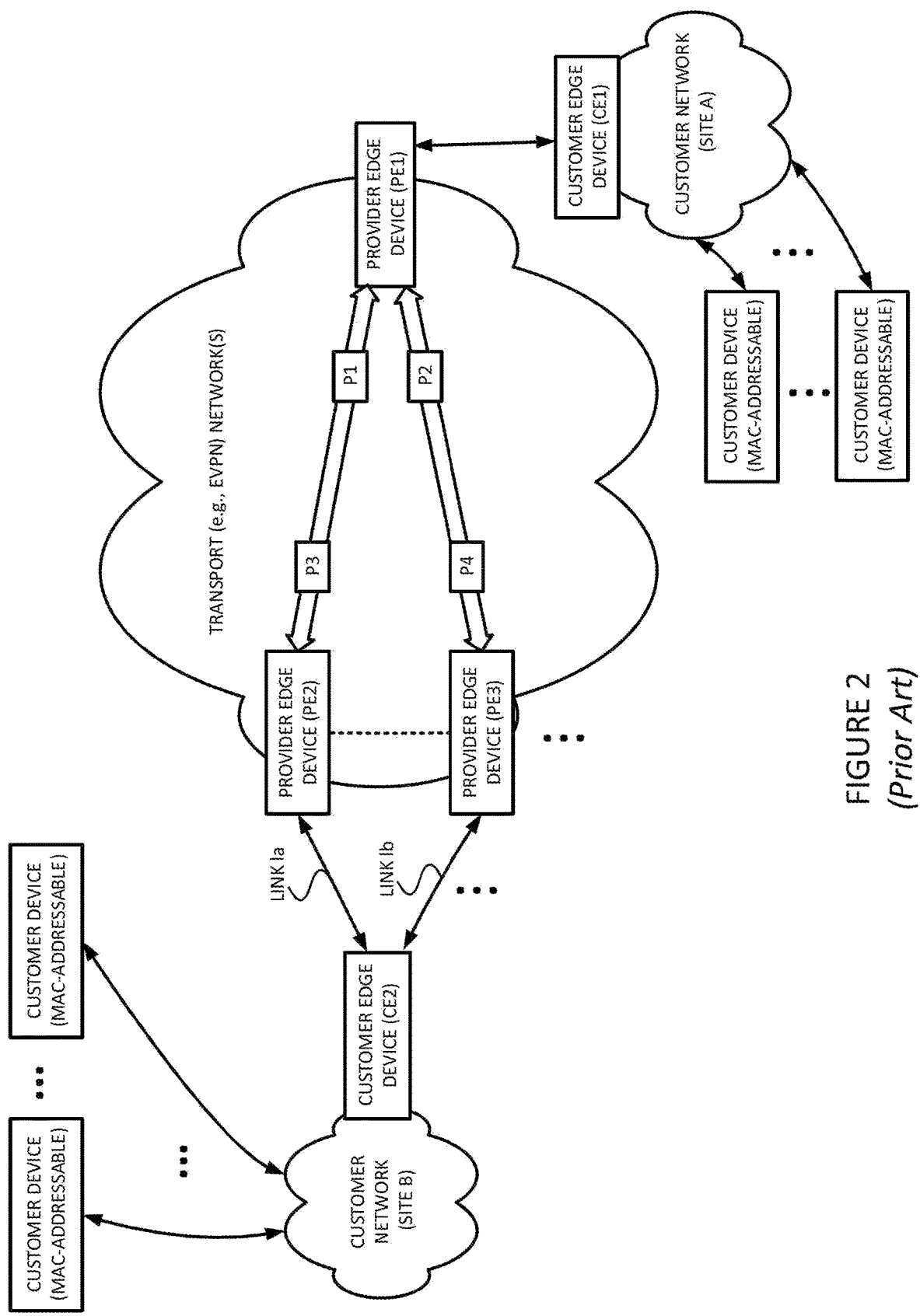
FIG. 2 illustrates an example of a customer edge device (CE) multihomed to two provider edge devices (PEs) of a transport network, in which looping may occur in the event of more than one fast reroute (FRR).
Figure 3:
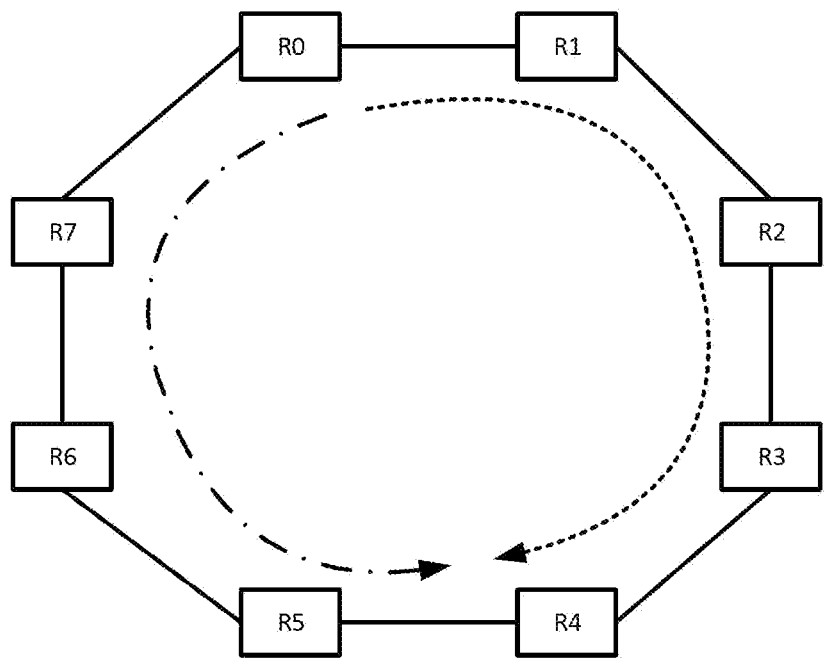
FIG. 3 illustrates an example resilient ring network, in which looping may occur in the event of more than one FRR.

Note that the second (or "further") FRR need not occur in response to a second failure. For example, if CE2 of FIG. 2 fails, a single failure may cause more than one FRR. That is, a single node failure can cause more than one link to become unavailable.

A protection LSP, providing an alternative path around a failed link, may be (or may be referred to as, or may include) a detour LSP, backup tunnel, a bypass tunnel, an NHOP bypass tunnel, an NNHOP bypass tunnel, a backup LSP, etc.

Further details of certain example embodiments may be described in the appendix to the '101 provisional.

What is claimed is:

1. A computer-implemented method for avoiding loops in a communications network, the computer-implemented method comprising:
   a) receiving, by a first data forwarding device, a data packet to be forwarded over a label-switched path (LSP);
   b) determining a next hop of the data packet received;
   c) determining whether or not the next hop is reachable;
   d) responsive to determining that the next hop is not reachable,
      1) determining (i) a backup next hop and (ii) a forwarding label associated with the backup next hop, and
      2) adding to the data packet, (1) the forwarding label and (2) a further label indicating that a backup detour is being made, to generate an updated data packet, and
      3) forwarding, by the data forwarding device, the updated data packet to the backup next hop, and
   otherwise, responsive to determining that the next hop is reachable, forwarding the data packet using a forwarding label associated with the next hop;
   e) receiving, by a second data forwarding device on the LSP, an instance of the data packet, wherein the instance of the data packet includes an incoming label;
   f) determining a further next hop of the instance of the data packet received using the incoming label;
   g) determining whether or not the further next hop is reachable;
   h) responsive to determining that the further next hop is not reachable,
      1) determining whether or not the instance of the data packet received includes the further label indicating that a backup detour was made, and
      2) responsive to the determination that the instance of the data packet received includes the further label indicating that a backup detour was made, dropping the instance of the data packet, and
   otherwise, responsive to determining that the further next hop is reachable,
      1) popping the incoming label of the instance of the data packet,
      2) removing the further label indicating that a backup detour was made if the further label indicating that a backup detour was made is at the top a label stack associated with the instance of the data packet,
      3) adding an outgoing label if the next hop includes an outgoing label, and
      4) forwarding the instance of the data packet using the further next hop.

2. The computer-implemented method of claim 1, wherein the further label indicating that a backup detour is being made is one of (A) a special purpose label, (B) an extended special purpose label, and (C) an allocated label.

3. The computer-implemented method of claim 1, wherein the act of adding to the data packet, the forwarding label and the further label indicating that a backup detour is being made, to generate an updated data packet, includes
   replacing a forwarding label on the data packet received with the forwarding label associated with the backup next hop, and
   pushing the further label used to indicate that a backup detour is being made.

4. The computer-implemented method of claim 3 wherein the further label used to indicate that a backup detour is being made is one of (A) a special purpose label, (B) an extended special purpose label, and (C) an allocated label.

5. The computer-implemented method of claim 1, wherein the act of adding to the data packet, the forwarding label and the further label indicating that a backup detour is being made, to generate an updated data packet, includes
   stacking the forwarding label associated with the backup next hop over a forwarding label on the data packet received, and
   pushing the further label used to indicate that a backup detour is being made.

6. The computer-implemented method of claim 5 wherein the further label used to indicate that a backup detour is being made is one of (A) a special purpose label, (B) an extended special purpose label, or (C) an allocated label.

7. The computer-implemented method of claim 1 wherein the backup next hop points to a backup LSP, wherein the backup LSP includes a plurality of data forwarding devices, and wherein each of the data forwarding devices included in the backup LSP have used control signaling to indicate that they are capable of processing the further label indicating that a backup detour is being made.

8. The computer-implemented method of claim 1 wherein the backup next hop is part of one of (A) a detour LSP, (B) a backup tunnel, (C) a bypass tunnel, (D) an NHOP bypass tunnel, (E) an NNHOP bypass tunnel, and (F) a backup LSP.

9. The computer-implemented method of claim 1, further comprising:
   i) receiving, by a third data forwarding device on the LSP, an instance of the data packet;
   j) determining another further next hop of the instance of the data packet received;
   k) determining whether or not the other further next hop is reachable; and
   l) responsive to determining that the other further next hop is not reachable,
      1) determining whether or not the instance of the data packet received includes the further label indicating that a backup detour was made, and
      2) responsive to the determination that the instance of the data packet received includes the further label indicating that a backup detour was made, dropping the instance of the data packet, and
   otherwise, responsive to determining that the other further next hop is available, forwarding the instance of the data packet using a forwarding label associated with the other further next hop.

10. The computer-implemented method of claim 1, wherein the backup detour is a segment routed (SR) path defined by a stack of labels.

11. The computer implemented method of claim 1, wherein the backup detour is a loop-free alternative (LFA) path.

12. A system, the system comprising:
a data forwarding device including:
  a) at least one communications interface;
  b) at least one processor; and
  c) at least one storage device storing processor-executable instructions which, when executed by the at least one processor, cause the at least one processor to perform a method comprising:
    1) receiving, by the data forwarding device on a label switched path (LSP), a data packet;
    2) determining a next hop of the data packet received;
    3) determining whether or not the next hop is reachable;
    4) responsive to determining that the next hop is not reachable,
      A) determining whether or not the data packet received includes a further label identifying that the data packet had made a backup detour, and
      B) responsive to the determination that the data packet received includes the further label identifying that the data packet had made a backup detour,
        dropping the data packet, and
      otherwise, responsive to a determination that the data packet received does not include a further label identifying that the data packet had made a backup detour,
        determining (i) a backup next hop and (ii) a forwarding label associated with the backup next hop, and
        adding to the data packet, (1) the forwarding label and (2) another label indicating that a backup detour is being made, to generate an updated data packet; and
        forwarding, by the data forwarding device, the updated data packet to the backup next hop, and
      otherwise, responsive to determining that the next hop is reachable, forwarding the data packet using a forwarding label associated with the next hop; and
a second data forwarding device including:
  a) at least one communications interface;
  b) at least one processor; and
  c) at least one storage device storing processor-executable instructions which, when executed by the at least one processor of the second data forwarding device, cause the at least one processor of the second data forwarding device to perform a method comprising:
    1) receiving, by the second data forwarding device on the LSP, an instance of the data packet, wherein the instance of the data packet includes an incoming label;
    2) determining, by the second data forwarding device, a further next hop of the instance of the data packet received using the incoming label;
    3) determining, by the second data forwarding device, whether or not the further next hop is reachable; and
    4) responsive to determining that the further next hop is not reachable,
      determining, by the second data forwarding device, whether or not the instance of the data packet received includes the other label indicating that a backup detour was made, and
      responsive to a determination that the instance of the data packet received includes the other label indicating that a backup detour was made, dropping the instance of the data packet, and
      otherwise, responsive to determining that the further next hop is reachable,
        popping the incoming label of the instance of the data packet,
        removing the other label indicating that a backup detour was made if the other label indicating that a backup detour was made is at the top a label stack associated with the instance of the data packet,
        adding an outgoing label if the next hop includes an outgoing label,
        and
        forwarding the instance of the data packet using the further next hop.

13. The system of claim 12 wherein the further label indicating that a backup detour is being made is one of (A) a special purpose label, (B) an extended special purpose label, and (C) an allocated label.

14. The system of claim 12 wherein the backup next hop points to a backup LSP, wherein the backup LSP includes a plurality of data forwarding devices, and wherein each of the data forwarding devices included in the backup LSP have used control signaling to indicate that they are capable of processing the further label indicating that a backup detour is being made.

15. The system of claim 12 wherein the backup next hop is part of one of (A) a detour LSP, (B) a backup tunnel, (C) a bypass tunnel, (D) an NHOP bypass tunnel, (E) an NNHOP bypass tunnel, and (F) a backup LSP.

16. The system of claim 12, wherein the backup detour is a segment routed (SR) path defined by a stack of labels.

17. The system of claim 12, wherein the backup detour is a loop-free alternative (LFA) path.

18. A storage system including at least one non-transitory storage medium storing processor-executable instructions which, when executed by at least one processor, cause the at least one processor to perform a method comprising:
  a) receiving, by a first data forwarding device, a data packet to be forwarded over a label-switched path (LSP);
  b) determining a next hop of the data packet received;
  c) determining whether or not the next hop is reachable;
  d) responsive to determining that the next hop is not reachable,
    1) determining (i) a backup next hop and (ii) a forwarding label associated with the backup next hop, and
    2) adding to the data packet, (1) the forwarding label and (2) a further label indicating that a backup detour is being made, to generate an updated data packet, and
    3) forwarding, by the data forwarding device, the updated data packet to the backup next hop, and
  otherwise, responsive to determining that the next hop is reachable, forwarding the data packet using a forwarding label associated with the next hop;
  e) receiving, by a second data forwarding device on the LSP, an instance of the data packet, wherein the instance of the data packet includes an incoming label;
  f) determining a further next hop of the instance of the data packet received using the incoming label;
  g) determining whether or not the further next hop is reachable;

h) responsive to determining that the further next hop is not reachable,
  1) determining whether or not the instance of the data packet received includes the further label indicating that a backup detour was made, and
  2) responsive to the determination that the instance of the data packet received includes the further label indicating that a backup detour was made, dropping the instance of the data packet, and
otherwise, responsive to determining that the further next hop is reachable,
  1) popping the incoming label of the instance of the data packet,
  2) removing the further label indicating that a backup detour was made if the further label indicating that a backup detour was made is at the top a label stack associated with the instance of the data packet,
  3) adding an outgoing label if the next hop includes an outgoing label, and
  4) forwarding the instance of the data packet using the further next hop.

19. The storage system of claim 18, wherein the act of adding to the data packet, the forwarding label and the further label indicating that a backup detour is being made, to generate an updated data packet, includes replacing a forwarding label on the data packet received with the forwarding label associated with the backup next hop, and pushing the further label used to indicate that a backup detour is being made.

20. The storage system of claim 18, wherein the act of adding to the data packet, the forwarding label and the further label indicating that a backup detour is being made, to generate an updated data packet, includes stacking the forwarding label associated with the backup next hop over a forwarding label on the data packet received, and pushing the further label used to indicate that a backup detour is being made.

* * * * *